US012022358B2

(12) United States Patent
Karmanov et al.

(10) Patent No.: US 12,022,358 B2
(45) Date of Patent: Jun. 25, 2024

(54) SELF-SUPERVISED PASSIVE POSITIONING USING WIRELESS DATA

(71) Applicant: QUALCOMM Incorporated, San Diego, CA (US)

(72) Inventors: Ilia Karmanov, Amsterdam (NL); Daniel Hendricus Franciscus Dijkman, Haarlem (NL); Farhad Ghazvinian Zanjani, Almere (NL); Ishaque Ashar Kadampot, San Diego, CA (US); Simone Merlin, San Diego, CA (US); Brian Michael Buesker, San Diego, CA (US); Vamsi Vegunta, San Diego, CA (US); Harshit Joshi, San Diego, CA (US); Fatih Murat Porikli, San Diego, CA (US); Joseph Binamira Soriaga, San Diego, CA (US); Bibhu Mohanty, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 744 days.

(21) Appl. No.: 17/229,825

(22) Filed: Apr. 13, 2021

(65) Prior Publication Data
US 2022/0329973 A1   Oct. 13, 2022

(51) Int. Cl.
*H04W 4/029*   (2018.01)
*G01S 5/00*   (2006.01)
*G01S 5/02*   (2010.01)
*G06N 20/00*   (2019.01)

(52) U.S. Cl.
CPC ............ *H04W 4/029* (2018.02); *G01S 5/013* (2020.05); *G01S 5/0278* (2013.01); *G06N 20/00* (2019.01)

(58) Field of Classification Search
CPC ...... H04W 4/029; G01S 5/013; G01S 5/0278; G06N 20/00
USPC ...................................................... 455/456.1
See application file for complete search history.

(56) References Cited

U.S. PATENT DOCUMENTS

| 10,667,147 | B2* | 5/2020 | Wen ..................... H04B 17/318 |
| 10,812,711 | B2* | 10/2020 | Sapienza ................ H04N 23/65 |
| 11,216,663 | B1* | 1/2022 | Ettinger ............... G05D 1/0016 |
| 11,573,558 | B2* | 2/2023 | Cella ................... G06F 18/2178 |
| 11,632,181 | B2* | 4/2023 | O'Shea ................. H04W 24/08 706/12 |
| 2014/0327571 | A1* | 11/2014 | Westcott ............... G01S 5/0249 342/351 |

(Continued)

FOREIGN PATENT DOCUMENTS

| CN | 107968689 A | * | 4/2018 | ............. H04B 17/21 |
| CN | 113994345 A | * | 1/2022 | ............ A45C 13/001 |

(Continued)

OTHER PUBLICATIONS

International Search Report and Written Opinion—PCT/US2022/018577—ISA/EPO—Jul. 25, 2022.

*Primary Examiner* — Mahendra R Patel
(74) *Attorney, Agent, or Firm* — Polsinelli/Qualcomm

(57) ABSTRACT

Disclosed are systems, methods, and non-transitory media for performing passive radio frequency (RF) location detection operations. In some aspects, RF data, such as RF signals including channel state information (CSI), can be received from a wireless device. The RF data can be provided to a self-supervised machine-learning architecture that is configured to perform object location estimation.

30 Claims, 15 Drawing Sheets

(56) References Cited

U.S. PATENT DOCUMENTS

| | | | |
|---|---|---|---|
| 2016/0125626 A1* | 5/2016 | Wang | G06T 11/005 |
| | | | 348/47 |
| 2017/0039469 A1* | 2/2017 | Majumdar | G06F 18/2411 |
| 2017/0123487 A1* | 5/2017 | Hazra | G06F 3/0482 |
| 2017/0154140 A1* | 6/2017 | Wilson | G06F 30/20 |
| 2017/0243113 A1* | 8/2017 | Fukuda | G06N 3/045 |
| 2020/0166609 A1* | 5/2020 | Trotta | G01S 7/417 |
| 2021/0004021 A1* | 1/2021 | Zhang | G06T 19/00 |
| 2021/0034679 A1* | 2/2021 | Cristache | G06V 20/10 |
| 2021/0041548 A1* | 2/2021 | Chen | G01S 13/003 |
| 2022/0148184 A1* | 5/2022 | Biswas | G06N 20/00 |
| 2022/0327360 A1* | 10/2022 | Merlin | H04B 17/318 |
| 2022/0337972 A1 | 10/2022 | Karmanov et al. | |

FOREIGN PATENT DOCUMENTS

| | | | | |
|---|---|---|---|---|
| EP | 3425421 A1 * | 1/2019 | | G01S 13/867 |
| EP | 3411670 B1 * | 8/2021 | | G01D 21/00 |
| WO | 2020037313 A1 | 2/2020 | | |
| WO | WO-2020037313 A1 * | 2/2020 | | H04L 63/0861 |
| WO | 2020170221 A1 | 8/2020 | | |
| WO | WO-2020170221 A1 * | 8/2020 | | G01S 7/415 |
| WO | WO-2021026427 A1 * | 2/2021 | | G01C 21/206 |

* cited by examiner

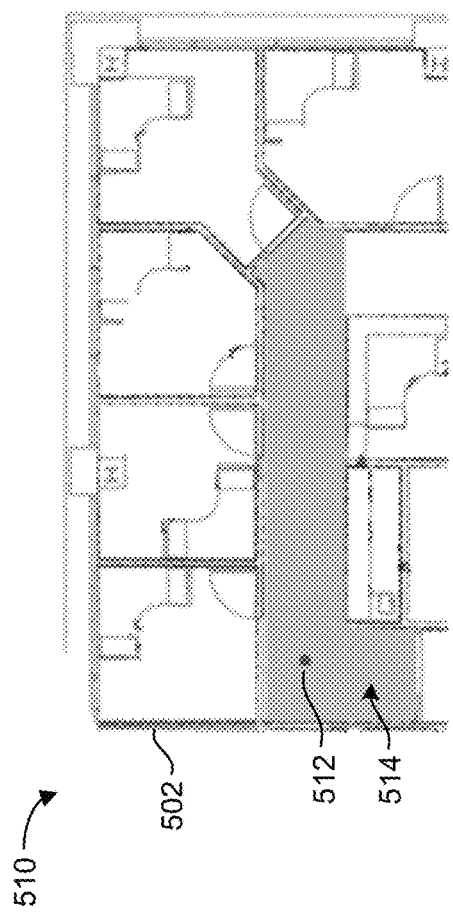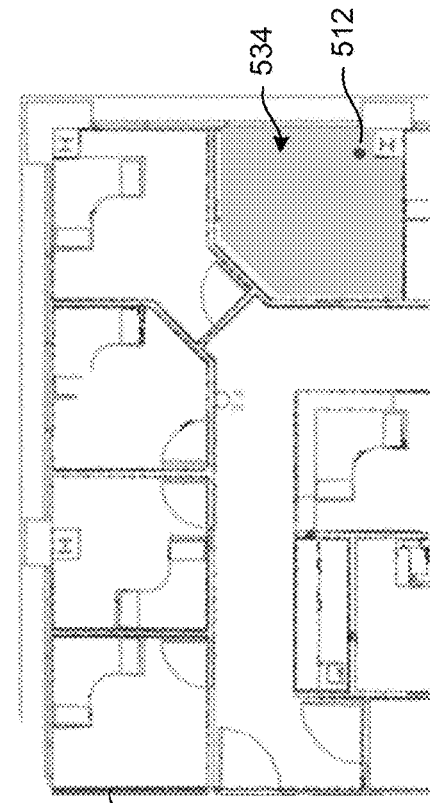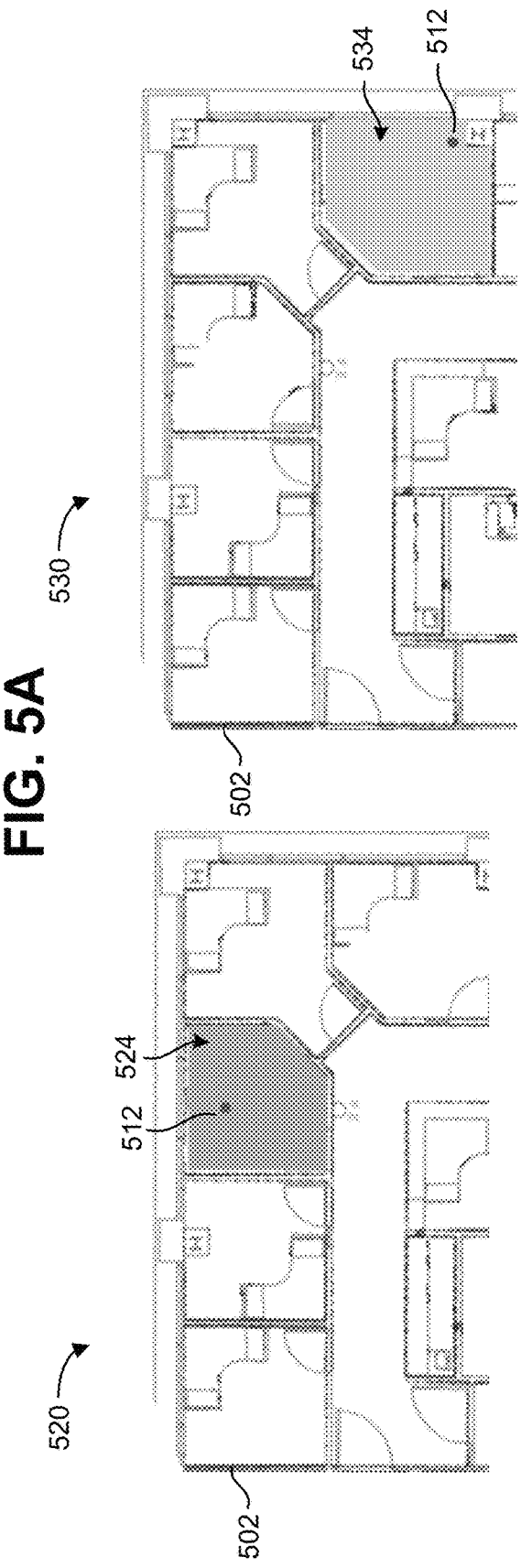

SELF-SUPERVISED PASSIVE POSITIONING USING WIRELESS DATA

FIELD OF THE DISCLOSURE

Aspects of the disclosure relate generally to wireless positioning and the like. In some implementations, examples are described for providing passive positioning based on wireless data, such as radio frequency (RF) data.

BACKGROUND OF THE DISCLOSURE

Wireless sensing devices are capable of providing radio frequency features that can be used to detect objects in a given environment. For example, radio frequency sensing devices can include software and hardware components that can be distributed throughout an environment and can be configured to track users moving throughout the environment. In order to implement various telecommunications functions, wireless sensing devices can include hardware and software components that are configured to transmit and receive radio frequency (RF) signals. For example, a wireless device can be configured to communicate via Wi-Fi, 5G/New Radio (NR), Bluetooth™, and/or ultra-wideband (UWB), among others.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for making location predictions based on radio frequency (RF) data. According to at least one example, an apparatus for performing location prediction is provided. The apparatus can include at least one network interface, at least one memory, and at least one processor (e.g., configured in circuitry) coupled to the at least one memory. The at least one processor is configured to: obtain, via the at least one network interface, radio frequency (RF) data; determining a plurality of feature vectors based on the RF data; generate a plurality of first clusters based on the plurality of feature vectors, wherein the first clusters correspond with a plurality of first pseudo-labels; determine a plurality of two-dimensional (2D) projection features based on the plurality of feature vectors; and train a first ML model using the plurality of first pseudo-labels and the 2D projection features.

In another example, a method for performing location prediction is provided. According to at least one example, a method for training one or more location prediction models is provided that includes: obtaining radio frequency (RF) data; determining a plurality of feature vectors based on the RF data; generating a plurality of first clusters based on the plurality of feature vectors, wherein the first clusters correspond with a plurality of first pseudo-labels; determining a plurality of two-dimensional (2D) projection features based on the plurality of feature vectors; and training a first ML model using the plurality of first pseudo-labels and the 2D projection features.

In another example, a non-transitory computer-readable storage medium is provided that comprises at least one instruction for causing a computer or processor to: obtain, radio frequency (RF) data; determine a plurality of feature vectors based on the RF data; generate a plurality of first clusters based on the plurality of feature vectors, wherein the first clusters correspond with a plurality of first pseudo-labels; determine a plurality of two-dimensional (2D) projection features based on the plurality of feature vectors; and train a first ML model using the plurality of first pseudo-labels and the 2D projection features.

In another example, an apparatus for performing location prediction is provided. The apparatus includes: means for obtaining, radio frequency (RF) data; means for determining a plurality of feature vectors based on the RF data; means for generating a plurality of first clusters based on the plurality of feature vectors, wherein the first clusters correspond with a plurality of first pseudo-labels; means for determining a plurality of two-dimensional (2D) projection features based on the plurality of feature vectors; and means for training a first ML model using the plurality of first pseudo-labels and the 2D projection features.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 5A-5C are diagrams illustrating examples of object detection utilizing a distributed sensing system, in accordance with some examples;

DETAILED DESCRIPTION

Figure 1:
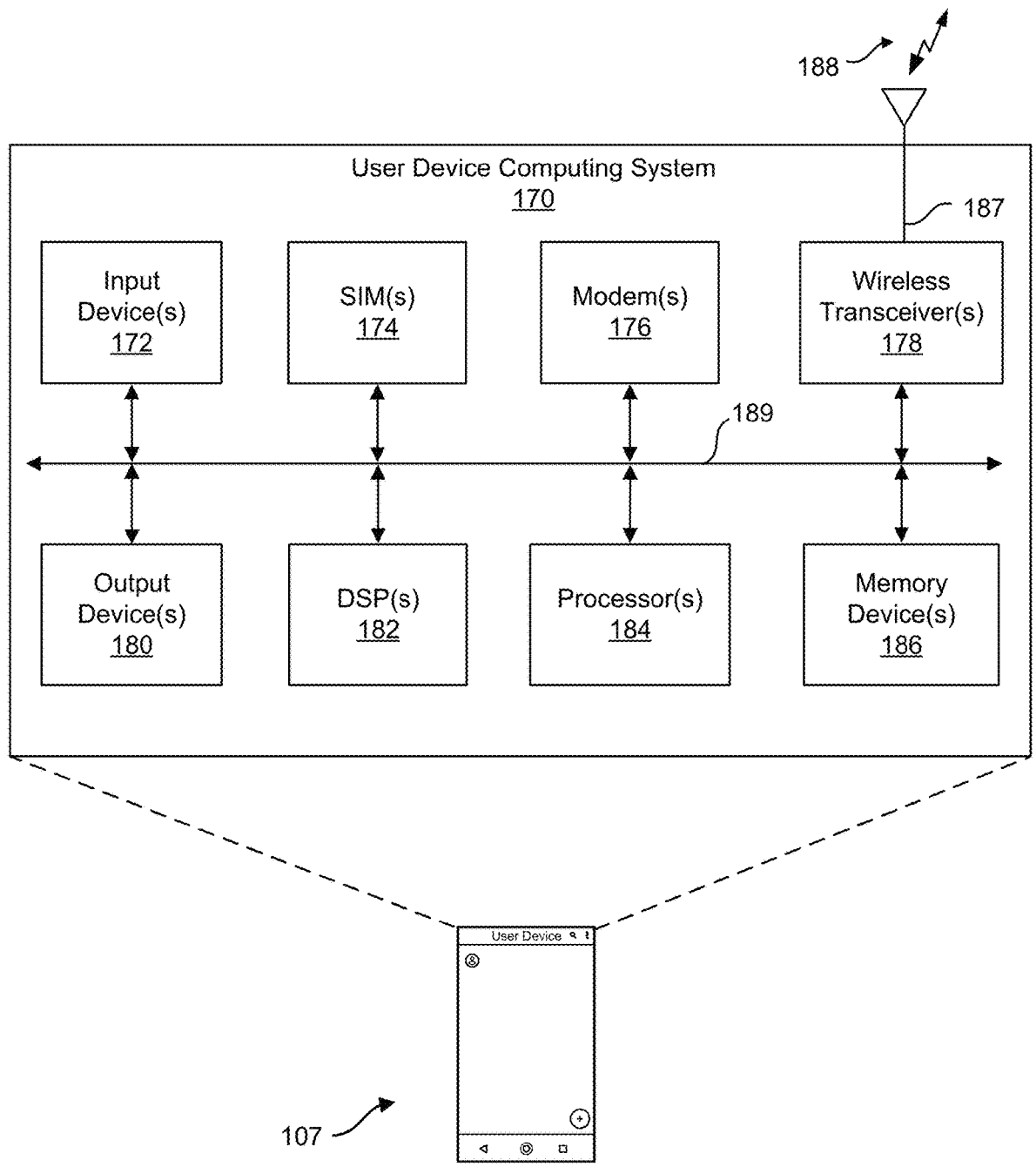
FIG. 1 is a block diagram illustrating an example of a computing system of a user device, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Many sensing devices (e.g., portable electronic devices, smartphones, tablets, laptops, and WiFi mesh Access Points) are capable of performing radio frequency sensing (also referred to as RF sensing). For example, sensing devices can utilize RF sensing techniques to perform object detection (e.g., determining that an intruder has entered the premises). RF sensing has many applications, such as tracking object movement, providing home and business security, among others.

In some examples, radio frequency sensing can utilize signals (e.g., WiFi signals, 3GPP signals, Bluetooth™ signals, etc.) to detect and characterize changes in an environment, such as passive positioning or motion of people and activity characterization. For instance, a radio frequency sensing system, as described herein, can analyze communications associated with wireless devices (e.g., WiFi Access Points or other devices), which can be referred to as sensing devices, to provide accurate detection and location estimation of one or more moving objects (e.g., a person or other object) in an environment. Examples of sensing detection operations include detecting motion (e.g., presence of motion or lack of motion or no-motion), motion patterns (e.g., walking, falling, gestures, or other motion), motion location (e.g., a position), motion tracking (e.g., movement of an object, such as a person, over time), vital signs of a person or animal (e.g., breathing, heart rate, etc.), any combination thereof, and/or other information, among others. In one illustrative example, positioning of a moving object can be determined in a multi-room environment, such as a multi-room indoor environment.

In some cases, machine-learning based systems can perform various sensing detection operations, such as position detection, motion detection, motion tracking, among others. Using labels and test or training data, the machine-learning system can be trained to perform the sensing detection operations. However, it can be difficult to obtain enough labeled training data to effectively train such some machine-learning systems. For instance, in some cases, an adequate number of position labels may not be available due to difficulties in performing ground truth data-collection, e.g., due to cost, difficulty, and/or privacy concerns.

The disclosed technology provides solutions for improving machine-learning location estimation generally, and in particular deployments in scenarios where labeling/training data is sparse. In some aspects, the present disclosure provides systems, apparatuses, processes (also referred to as methods), and computer-readable media (collectively referred to as "systems and techniques") for performing self-supervision to generate a model that predicts the precise position of an object (e.g., a person) in a three-dimensional (3D) environment. In some aspects, a process of the disclosed technology uses RF data, such as Channel State Information (CSI) to generate a topologically accurate two-dimensional 2D latent-space that can be mapped onto a real-world Cartesian space using a sparse number of priors. Depending on the implementation, the priors can include, but are not limited to, location information for various wireless devices (e.g., access points), topological features (e.g., information about an indoor floor-plan), and/or room-level labels, and the like. Using only sparse labeling information, precise positions for various objects (e.g., persons/users) can be performed for different topographies, such as multi-room environments, without the need for using precise position labels during training.

As discussed in further detail below, aspects of the disclosed technology utilize a triplet-loss to train a machine-learning model (e.g., a neural-network) in an unsupervised manner. The triplet-loss can be based on a temporal characteristic of packets or samples (e.g., CSI samples). described below. In some aspects, the ML architecture can be configured to simultaneously learn a spatial similarity metric between input RF data (e.g., CSI samples) and to perform dimensionality reduction to generate a 2D latent space that is topologically similar to the target environment. In some aspects, by combining a triplet-loss with neural clustering, which involves clustering the representation encoded by a neural-network, and then training the network to predict the previously assigned clusters (pseudo-labels), the generated 2D latent-space can be accurately mapped into the target environment. In some approaches, the triplet-loss and neural clustering can function as compliments. For example, the triplet-loss can encourage the model to learn a representation that brings together certain samples (e.g., samples or points that are close in time and in some cases close in space). In turn, the neural clustering can extend the solution to points that are spatially proximate yet temporally distant. In some aspects, the latent space can be mapped into a real-world (Cartesian) representation using user provided priors, for example, that can include various types of information, including but not limited to locations of the access-points, floor-plan information, and/or zone labels. The zone labels can be a 'property' that is associated with a specific collected CSI, and can indicate that a certain CSI was collected while the user was in a particular zone X. For example, during training, a user with a device (e.g., a mobile device or a smart phone) can walk in different zones of a venue and can indicate in which zone the user is located (e.g., by inputting a room or zone indicator in an interface of the device). The system can attach that information to the corresponding CSI that is received at that point in time.

In some examples, real-world priors may be provided by a user via an application, for example, that is executed on a device (e.g., a mobile device or a smart phone) associated with the user. By way of example, the application (or app) can facilitate the ability for a user to provide a sketch of the environment in which location estimation is to be performed, provide location information regarding one or more wireless devices (e.g., access points or base stations) associated with the environment, and/or provide room or zone indicator that indicate which room or zone the user is in (e.g., which can be used for the zone labels noted above). For instance, in some implementations, the app can be used to receive input indicators regarding features of the environment, such as room or zone indicators, or other descriptors.

Various aspects of the systems and techniques described herein will be discussed below with respect to the figures. FIG. 1 illustrates an example of a computing system 170 of a user device 107. The user device 107 is an example of a device that can be used by an end-user. For example, the user device 107 can include a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some cases, the device can be referred to as a station (STA), such as when referring to a device configured to communicate using the Wi-Fi standard. In some cases, the device can be referred to as user equipment (UE), such as when referring to a device configured to communicate using 5G/New Radio (NR), Long-Term Evolution (LTE), or other telecommunication standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network devices (e.g., base stations such as eNBs and/or gNBs, WiFi access points (APs) such as routers, range extenders or the like, etc.), cloud networks, and/or the like. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the user device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a WiFi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 2:
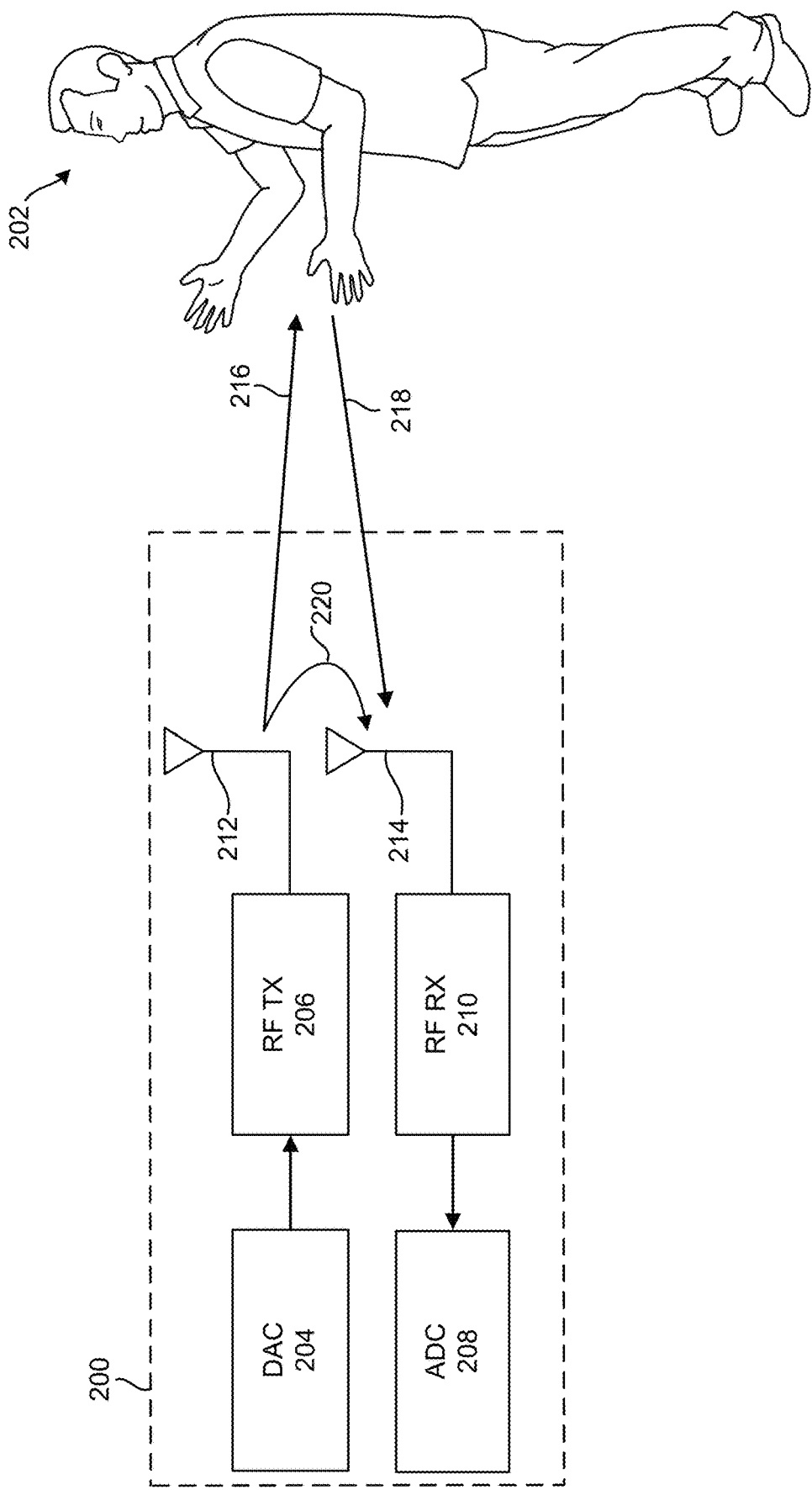
FIG. 2 is a diagram illustrating an example of a wireless device utilizing radio frequency (RF) sensing techniques to detect a user presence, in accordance with some examples.

FIG. 2 is a diagram illustrating an example of a wireless device 200 that utilizes RF sensing techniques to perform one or more functions, such as detecting a presence of a user 202, detecting orientation characteristics of the user, performing motion detection, any combination thereof, and/or perform other functions. In some examples, the wireless device 200 can be the user device 107, such as a mobile phone, a tablet computer, a wearable device, or other device that includes at least one RF interface. In some examples, the wireless device 200 can be a device that provides connectivity for a user device (e.g., for user device 107), such as a wireless access point (AP), a base station (e.g., a gNB, eNB, etc.), or other device that includes at least one RF interface.

In some aspects, wireless device 200 can include one or more components for transmitting an RF signal. Wireless device 200 can include a digital-to-analog converter (DAC) 204 that is capable of receiving a digital signal or waveform (e.g., from a microprocessor, not illustrated) and converting the signal or waveform to an analog waveform. The analog signal that is the output of DAC 204 can be provided to RF transmitter 206. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as TX antenna 212. In some examples, TX antenna 212 can be an omnidirectional antenna that is capable of transmitting an RF signal in all directions. For example, TX antenna 212 can be an omnidirectional Wi-Fi antenna that can radiate Wi-Fi signals (e.g., 2.4 GHz, 5 GHz, 6 GHz, etc.) in a 360-degree radiation pattern. In another example, TX antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as RX antenna 214. In some examples, RX antenna 214 can be an omnidirectional antenna capable of receiving RF signals from multiple directions. In other examples, RX antenna 214 can be a directional antenna that is configured to receive signals from a particular direction. In further examples, both TX antenna 212 and RX antenna 214 can include multiple antennas (e.g., elements) configured as an antenna array.

Wireless device 200 can also include an RF receiver 210 that is coupled to RX antenna 214. RF receiver 210 can include one or more hardware components for receiving an RF waveform such as a Wi-Fi signal, a Bluetooth™ signal, a 5G/NR signal, or any other RF signal. The output of RF receiver 210 can be coupled to an analog-to-digital converter (ADC) 208. ADC 208 can be configured to convert the received analog RF waveform into a digital waveform that can be provided to a processor such as a digital signal processor (not illustrated).

In one example, wireless device 200 can implement RF sensing techniques by causing TX waveform 216 to be transmitted from TX antenna 212. Although TX waveform 216 is illustrated as a single line, in some cases, TX waveform 216 can be transmitted in all directions by an omnidirectional TX antenna 212. In one example, TX waveform 216 can be a Wi-Fi waveform that is transmitted by a Wi-Fi transmitter in wireless device 200. In some cases, TX waveform 216 can correspond to a Wi-Fi waveform that is transmitted at or near the same time as a Wi-Fi data communication signal or a Wi-Fi control function signal (e.g., a beacon transmission). In some examples, TX waveform 216 can be transmitted using the same or a similar frequency resource as a Wi-Fi data communication signal or a Wi-Fi control function signal (e.g., a beacon transmission). In some aspects, TX waveform 216 can correspond to a Wi-Fi waveform that is transmitted separately from a Wi-Fi data communication signal and/or a Wi-Fi control signal (e.g., TX waveform 216 can be transmitted at different times and/or using a different frequency resource).

In some examples, TX waveform 216 can correspond to a 5G NR waveform that is transmitted at or near the same time as a 5G NR data communication signal or a 5G NR control function signal. In some examples, TX waveform 216 can be transmitted using the same or a similar frequency resource as a 5G NR data communication signal or a 5G NR control function signal. In some aspects, TX waveform 216 can correspond to a 5G NR waveform that is transmitted separately from a 5G NR data communication signal and/or a 5G NR control signal (e.g., TX waveform 216 can be transmitted at different times and/or using a different frequency resource).

In some aspects, one or more parameters associated with TX waveform 216 can be modified that may be used to increase or decrease RF sensing resolution. The parameters may include frequency, bandwidth, number of spatial streams, the number of antennas configured to transmit TX waveform 216, the number of antennas configured to receive a reflected RF signal corresponding to TX waveform 216, the number of spatial links (e.g., number of spatial streams multiplied by number of antennas configured to receive an RF signal), the sampling rate, or any combination thereof.

In further examples, TX waveform 216 can be implemented to have a sequence that has perfect or almost perfect autocorrelation properties. For instance, TX waveform 216 can include single carrier Zadoff sequences or can include symbols that are similar to orthogonal frequency-division multiplexing (OFDM) Long Training Field (LTF) symbols. In some cases, TX waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can further implement RF sensing techniques by performing concurrent transmit and receive functions. For example, wireless device 200 can enable its RF receiver 210 to receive at or near the same time as it enables RF transmitter 206 to transmit TX waveform 216. In some examples, transmission of a sequence or pattern that is included in TX waveform 216 can be repeated continuously such that the sequence is transmitted a certain number of times or for a certain duration of time. In some examples, repeating a pattern in the transmission of TX waveform 216 can be used to avoid missing the reception of any reflected signals if RF receiver 210 is enabled after RF transmitter 206. In one example implementation, TX waveform 216 can include a sequence having a sequence length L that is transmitted two or more times, which can allow RF receiver 210 to be enabled at a time less than or equal to L in order to receive reflections corresponding to the entire sequence without missing any information.

By implementing simultaneous transmit and receive functionality, wireless device 200 can receive any signals that correspond to TX waveform 216. For example, wireless device 200 can receive signals that are reflected from objects or people that are within range of TX waveform 216, such as RX waveform 218 reflected from user 202. Wireless device 200 can also receive leakage signals (e.g., TX leakage signal 220) that are coupled directly from TX antenna 212 to RX antenna 214 without reflecting from any objects. For example, leakage signals can include signals that are transferred from a transmitter antenna (e.g., TX antenna 212) on a wireless device to a receive antenna (e.g., RX antenna 214) on the wireless device without reflecting from any objects. In some cases, RX waveform 218 can include multiple sequences that correspond to multiple copies of a sequence that are included in TX waveform 216. In some examples, wireless device 200 can combine the multiple sequences that are received by RF receiver 210 to improve the signal to noise ratio (SNR).

Wireless device 200 can further implement RF sensing techniques by obtaining RF data associated with each of the received signals corresponding to TX waveform 216. In some examples, the RF data can include channel state information (CSI) data relating to the direct paths (e.g., leakage signal 220) of TX waveform 216 together with data relating to the reflected paths (e.g., RX waveform 218) that correspond to TX waveform 216.

In some aspects, RF data (e.g., CSI data) can include information that can be used to determine the manner in which an RF signal (e.g., TX waveform 216) propagates from RF transmitter 206 to RF receiver 210. RF data can include data that corresponds to the effects on the transmitted RF signal due to scattering, fading, and/or power decay with distance, or any combination thereof. In some examples, RF data can include imaginary data and real data (e.g., I/Q components) corresponding to each tone in the frequency domain over a particular bandwidth.

In some examples, RF data can be used to calculate distances and angles of arrival that correspond to reflected waveforms, such as RX waveform 218. In further examples, RF data can also be used to detect motion, determine location, detect changes in location or motion patterns, obtain channel estimation, or any combination thereof. In some cases, the distance and angle of arrival of the reflected signals can be used to identify the size, position, movement, or orientation of users in the surrounding environment (e.g., user 202) in order to detect object presence/proximity, detect object attention, and/or perform motion detection.

Wireless device 200 can calculate distances and angles of arrival corresponding to reflected waveforms (e.g., the distance and angle of arrival corresponding to RX waveform 218) by utilizing signal processing, machine learning algorithms, using any other suitable technique, or any combination thereof. In other examples, wireless device 200 can send the RF data to another computing device, such as a server, that can perform the calculations to obtain the distance and angle of arrival corresponding to RX waveform 218 or other reflected waveforms.

In one example, the distance of RX waveform 218 can be calculated by measuring the difference in time from reception of the leakage signal to the reception of the reflected signals. For example, wireless device 200 can determine a baseline distance of zero that is based on the difference from the time the wireless device 200 transmits TX waveform 216 to the time it receives leakage signal 220 (e.g., propagation delay). Wireless device 200 can then determine a distance associated with RX waveform 218 based on the difference from the time the wireless device 200 transmits TX waveform 216 to the time it receives RX waveform 218 (e.g., time of flight), which can then be adjusted according to the propagation delay associated with leakage signal 220. In doing so, wireless device 200 can determine the distance traveled by RX waveform 218 which can be used to determine the presence and movement of a user (e.g., user 202) that caused the reflection.

In further examples, the angle of arrival of RX waveform 218 can be calculated by measuring the time difference of arrival of RX waveform 218 between individual elements of a receive antenna array, such as antenna 214. In some examples, the time difference of arrival can be calculated by measuring the difference in received phase at each element in the receive antenna array.

In some cases, the distance and the angle of arrival of RX waveform 218 can be used to determine the distance between wireless device 200 and user 202 as well as the position of user 202 relative to wireless device 200. The distance and the angle of arrival of RX waveform 218 can also be used to determine presence, movement, proximity, attention, identity, or any combination thereof, of user 202. For example, wireless device 200 can utilize the calculated distance and angle of arrival corresponding to RX waveform 218 to determine that user 202 is walking towards wireless device 200. Based on the proximity of user 202 to wireless device 200, wireless device 200 can activate facial authentication in order to unlock the device. In some aspects, facial authentication can be activated based upon user 202 being within a threshold distance of wireless device 200. Examples of threshold distances can include 2 feet, 1 foot, 6 inches, 3 inches, or any other distance.

As noted above, wireless device 200 can include mobile devices (e.g., smartphones, laptops, tablets, access points, etc.) or other types of devices. In some examples, wireless device 200 can be configured to obtain device location data and device orientation data together with the RF data. In some instances, device location data and device orientation data can be used to determine or adjust the distance and angle of arrival of a reflected signal such as RX waveform 218. For example, wireless device 200 may be set on a table facing the ceiling as user 202 walks towards it during the RF sensing process. In this instance, wireless device 200 can use its location data and orientation data together with the RF data to determine the direction that the user 202 is walking.

In some examples, device position data can be gathered by wireless device 200 using techniques that include round trip time (RTT) measurements, passive positioning, angle of arrival, received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
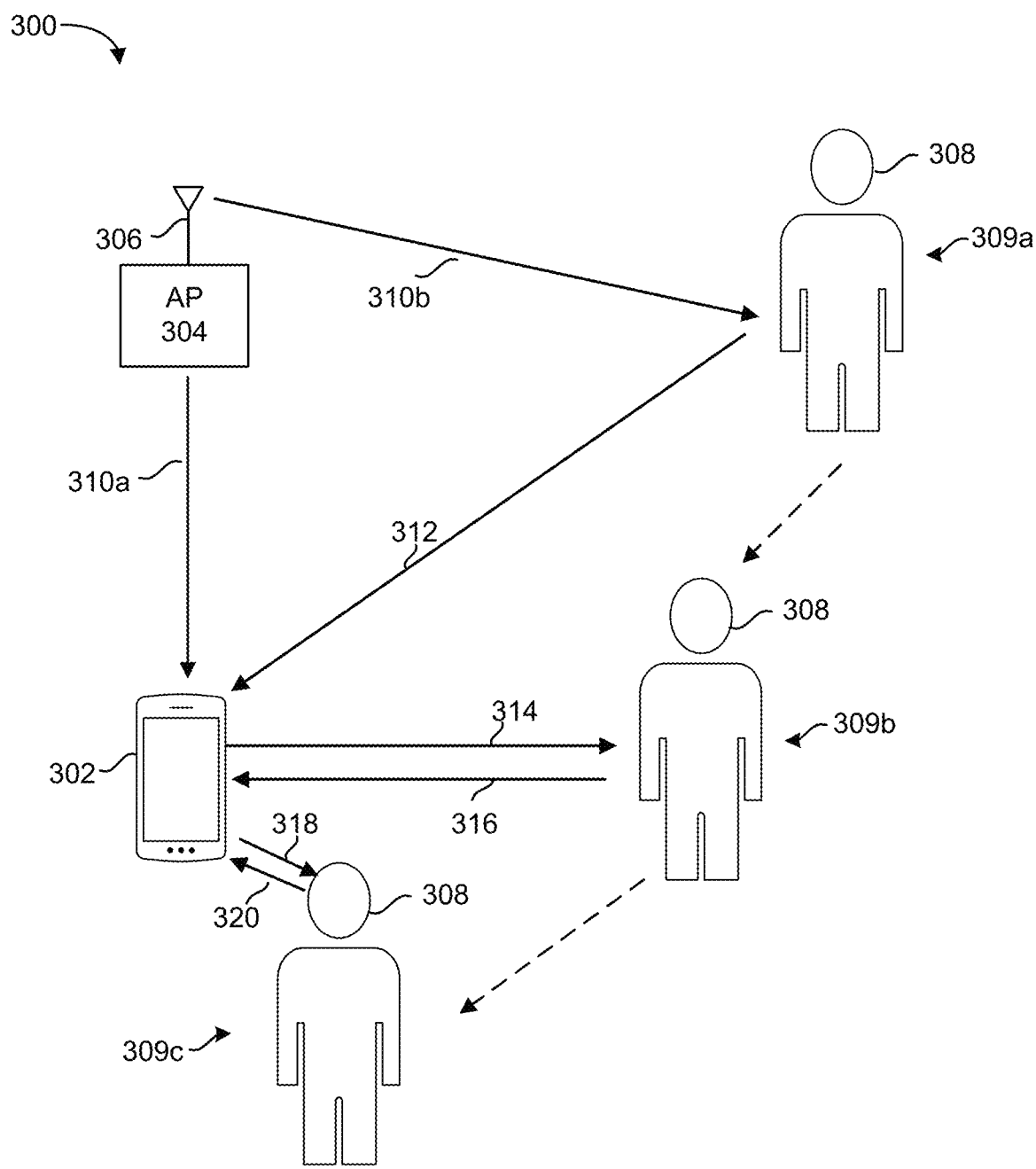
FIG. 3 is a diagram illustrating an example of an environment including wireless devices for facilitating the detection of a user location, in accordance with some examples.

FIG. 3 is a diagram illustrating an environment 300 that includes a wireless device 302, an access point (AP) 304, and a user 308. The wireless device 302 can include a user device (e.g., user device 107 of FIG. 1, such as a mobile device or any other type of device). The AP 304 can also be referred to as a sensing device, a radio frequency sensing device, or a wireless device in some examples. As shown, the user 308 can move to different positions (e.g., with the wireless device 302), including a first user position 309a, a second user position 309b, and a third user position 309c. In some aspects, the wireless device 302 and AP 304 can each be configured to perform RF sensing in order to detect a presence of the user 308, detect movement of the user 308, any combination thereof, and/or perform other functions with respect to the user 308.

In some aspects, AP 304 can be a Wi-Fi access point that includes hardware and software components that can be configured to simultaneously transmit and receive RF signals, such as the components described herein with respect to the wireless device 200 of FIG. 2. For example, AP 304 can include one or more antennas that can be configured to transmit an RF signal and one or more antennas that can be configured to receive an RF signal (e.g., antenna 306). As noted with respect to the wireless device 200 of FIG. 2, AP 304 can include omnidirectional antennas or antenna arrays that are configured to transmit and receive signals from any direction.

In some aspects, the AP 304 and the wireless device 302 can be configured to implement a bistatic configuration in which the transmit and receive functions are performed by different devices. For example, AP 304 can transmit an omnidirectional RF signal that can include signal 310a and signal 310b. As illustrated, signal 310a can travel directly (e.g., no reflections) from AP 304 to wireless device 302 and signal 310b can reflect off of user 308 at position 309a and cause a corresponding reflected signal 312 to be received by wireless device 302.

In some examples, wireless device 302 can utilize RF data associated with signal 310a and signal 310b to determine presence, location, orientation, and/or movement of user 308 at position 309a. For instance, wireless device 302 can obtain, retrieve, and/or estimate location data associated with AP 304. In some aspects, wireless device 302 can use location data associated with AP 304 and RF data (e.g., CSI data) to determine the time of flight, distance, and/or the angle of arrival associated signals transmitted by AP 304 (e.g., direct path signals such as signal 310a and reflected path signals such as signal 312). In some cases, AP 304 and wireless device 302 can further send and/or receive communications that can include data associated with RF signal 310a and/or reflected signal 312 (e.g., transmission time, sequence/pattern, time of arrival, angle of arrival, etc.).

In some examples, the wireless device 302 can be configured to perform RF sensing using a monostatic configuration, in which case the wireless device 302 performs both the transmit and receive functions (e.g., simultaneous TX/RX discussed in connection with wireless device 200). For instance, wireless device 302 can detect a presence or movement of user 308 at position 309b by transmitting RF signal 314, which can cause a reflected signal 316 from user 308 at position 309b to be received by wireless device 302.

In some aspects, wireless device 302 can obtain RF data associated with reflected signal 316. For example, RF data can include CSI data corresponding to reflected signal 316.

In further aspects, wireless device 302 can use the RF data to calculate a distance and an angle of arrival corresponding to reflected signal 316. For instance, wireless device 302 can determine distance by calculating a time of flight for reflected signal 316 based on the difference between a leakage signal (not illustrated) and reflected signal 316. In further examples, wireless device 302 can determine an angle of arrival by utilizing an antenna array to receive the reflected signals and measuring the difference in received phase at each element of the antenna array.

In some examples, wireless device 302 can obtain RF data in the form of CSI data that can be used to formulate a matrix that is based on the number of frequencies represented as 'K' (e.g., tones) and the number of antenna array elements represented as 'N'. In one technique, the CSI matrix can be formulated according to the relationship given by equation (1a):

$$\text{CSI Matrix: } H=[h_{ik}], i=1,N, k=1,K \tag{1a}$$

In some cases, the CSI matrix $h_{ik}$ is a complex number that represents the propagation properties (e.g., attenuation and phase) between a transmitter antenna and a receiver antenna, at a certain frequency (tone k), as estimated by using a reference signal sent by a transmitter antenna and received by a receiver antenna. In some examples, the CSI matrix $h_{ik}$ can be denoted as $h_{ijk}$, were i is the receive antenna index and j is the transmit antenna index. In some examples, the transmitter of the reference signal used to determine the CSI may comprise M>1 antennas and the CSI may be estimated per each of the transmit antennas. For instance, in such examples, the CSI matrix can be formulated according to the relationship given by equation (1b):

$$\text{CSI Matrix: } H=[h_{ijk}], i=1, j=1M, k=1, \ldots, K \tag{1b}$$

Upon formulating the CSI matrix, wireless device 302 can calculate the angle of arrival and time of flight for direct signal paths (e.g., leakage signals), as well as reflected signal paths (e.g., reflected signal 316) by utilizing a Two-Dimensional Fourier transform. In one example, a Fourier transform can be defined by the relationship given by equation (2) below, in which K corresponds to a number of tones in the frequency domain; N corresponds to a number of receive antennas; $h_{ik}$ corresponds to CSI data captured on the ith antenna and kth tone (e.g., a complex number having a real and an imaginary component); $f_0$ corresponds to a carrier frequency; l corresponds to an antenna spacing; c corresponds to the speed of light; and $\Delta f$ corresponds to a frequency spacing between two adjacent tones. The relationship of equation (2) is provided as follows:

$$F(\theta, d) = \sum_{i=1}^{N} \sum_{k=1}^{K} h_{ik} e^{j\frac{2\pi f_0 i l \sin\theta}{c}} e^{j\frac{2\pi d k \Delta f}{c}} \tag{2}$$

In some cases, a similar relation as that in equation (2) can be developed to estimate the angles of departure.

In some aspects, leakage signals (e.g., leakage signal 220 and/or other leakage signals) can be cancelled by using an iterative cancellation method.

In some cases, wireless device 302 can utilize the distance and an angle of arrival corresponding to reflected signal 316 to detect a presence or movement of user 308 at position 309b. In other examples, wireless device 302 can detect further movement of the user 308 to a third position 309c. Wireless device 302 can transmit RF signal 318 that causes reflected signal 320 from user 308 at position 309c. Based on the RF data associated with reflected signal 320, wireless device 302 can determine the location of user 308 at position 309c, detect the user's head presence and/or orientation, and/or perform facial recognition as well as facial authentication.

In some implementations, wireless device 302 may utilize artificial intelligence or machine-learning algorithms to perform motion detection, object classification, and/or detect head orientation relating to user 308. In some examples, the machine learning techniques can include supervised machine learning techniques such as those that utilize neural networks, linear and logistics regression, classification trees, support vector machines, any other suitable supervised machine learning technique, or any combination thereof. For instance, a dataset of sample RF data can be selected for training of the machine-learning algorithms.

In some aspects, wireless device 302 and AP 304 can perform RF sensing techniques irrespective of their association with each other or with a Wi-Fi network. For example, wireless device 302 can utilize its Wi-Fi transmitter and Wi-Fi receiver to perform RF sensing as discussed herein when it is not associated with any access point or Wi-Fi network. In further examples, AP 304 can perform RF sensing techniques regardless of whether it has any wireless devices associated with it.

In some aspects, wireless device 302 and AP 304 can facilitate RF sensing using one or more machine-learning models. For example, wireless device 302 and/or AP 304 can be configured to collect RF data about an environment associated with the various positions of user 308, and to provide the RF data to a machine-learning architecture, for example, that is configured to make location estimation prediction regarding the user 308.

In some aspects, labels regarding the environment can be received, e.g., from the user via wireless device 302. In some examples, the labels can include information regarding the location of one or more wireless devices (e.g., AP 304 and/or wireless device 302), as well as information about the environment, such as information indicating the floor plan and/or locations of various rooms, etc. An example of an indoor environment is provided in conjunction with FIG. 4.

Figure 4:
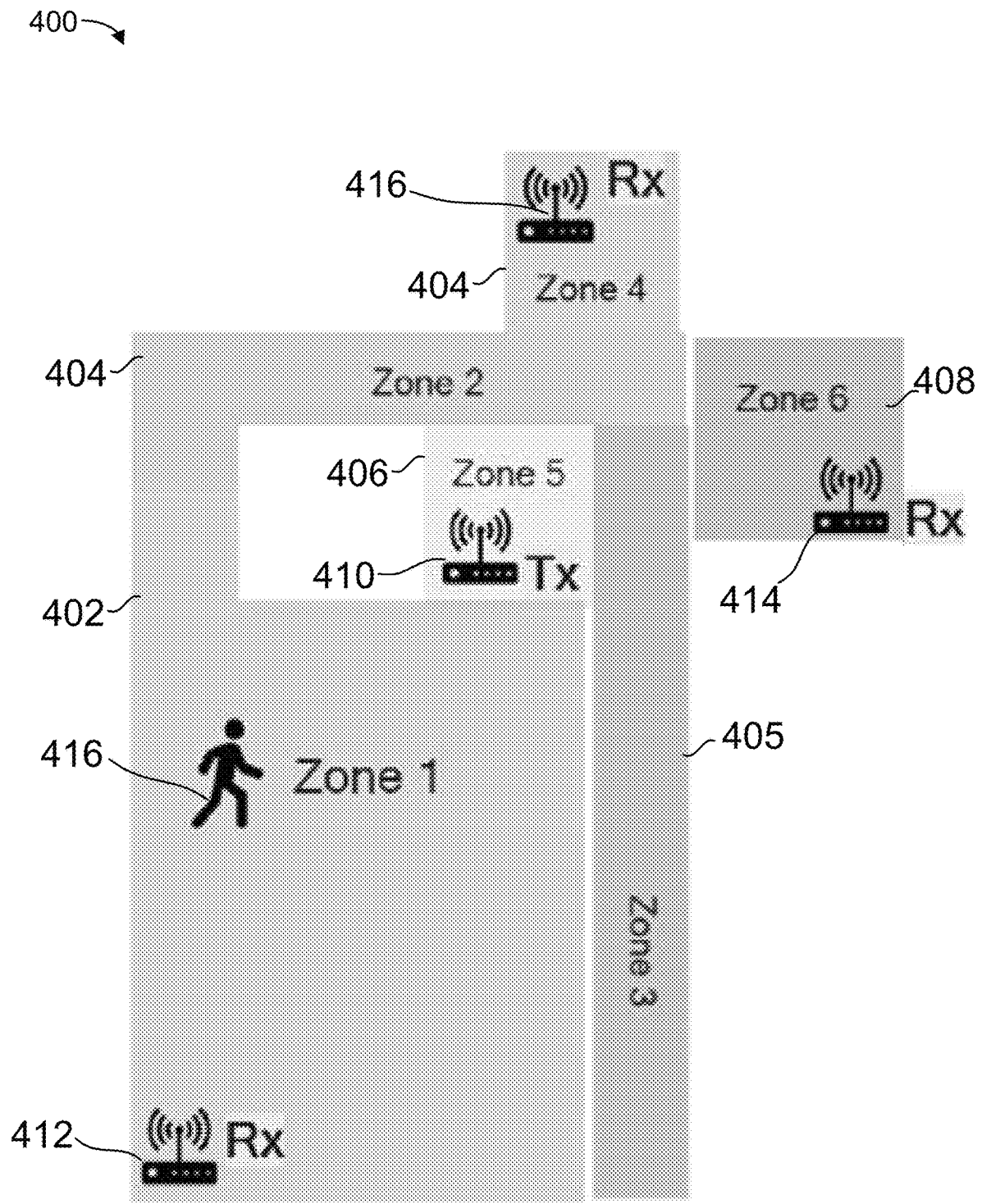
FIG. 4 is a diagram illustrating an example environment in which a location estimation process of the disclosed technology can be implemented.

FIG. 4 is a diagram illustrating an example environment 400 for which a location estimation process of the disclosed technology can be implemented. As illustrated, environment 400 includes a number of different wireless (sensing) devices, such as access points 410, 412, 414, 416. However, it is understood that other wireless devices, such as a wireless device associated with the user (e.g., wireless device 302) may be present in the environment 400, without departing from the scope of the disclosed technology.

In the example of FIG. 4, sensing devices 410, 412, 414, 416 are access points (e.g., a transmitting device 410, and receiving devices 412, 414, and 416); however, setups including a greater (or fewer) number of wireless devices are contemplated. By way of example, other wireless devices can include user devices (e.g., user device 107 of FIG. 1, such as a mobile device or any other type of device), Internet of Things (IoT) devices, extenders, replicators, any combination thereof, and/or any other wireless device.

Access points 410, 412, 414, 416 can operate as radio frequency sensing devices, Wi-Fi sensing enabled access points, and wireless devices utilizing at least one transceiver (or separate transmitter and receiver), as described herein. The access points 410, 412, 414, 416 and any other wireless devices (not illustrated) can be distributed throughout an environment to provide a distributed range of sensing coverage for the environment 400. For example, as shown in FIG. 4, the access points 410, 412, 414, 416 are positioned in various rooms or zones of an indoor environment. In the illustrated example, Zone 1 402 includes access point 412, whereas Zone 4 404 corresponds with access point 416, Zone 5 406 corresponds with access point 410, and Zone 6 408 corresponds with access point 414. Additionally, Zone 2 404, and Zone 3 405 contain no devices. The placement and position of the access points 410 and the wireless devices 412 can be used to determine the coverage of the distributed sensing system 400, which can be repositioned to provide optimal sensing coverage as described herein. Additionally, locations of sensing devices 410, 412, 414, 416.

In some aspects, RF data collected from environment 400 can be used to perform various radio frequency sensing-based detections, such as, for performing location estimation and/or motion profiling. For example, the RF data received by one or more of the sensing devices can include signals received directly from one or more of the other sensing devices 410, 412, 414, 416 and/or can include signals reflected off of one or more objects (e.g., people, animals, furniture) and/or structures (e.g., walls, ceilings, columns, etc.) in the environment.

In general, radio frequency signals are reflected by objects (e.g., walls, columns, furniture, animals, etc.) and/or people located in the dwelling 402. Data relating to radio frequency reflections includes amplitude and phase change of the radio frequency signals when objects/people move about a given space. By receiving RF data collected from environment 400, a location estimation system (not illustrated) can be utilized to produce precise location estimates for various users (e.g., user 416) and/or other objects in the environment 400. Depending on the implementation, a location estimation system may also be configured to identify motion profiles and/or patterns (e.g., by detecting the presence of motion or lack of motion or no-motion), motion patterns (e.g., walking, falling, gestures, or other motion), motion location (e.g., a position), motion tracking (e.g., movement of an object or person over time), vital signs of a person or animal (e.g., breathing, heart rate, etc.), any combination thereof, and/or other information.

In some implementations, RF signals can be utilized to determine characteristics (e.g., position and movement) of objects detected within the environment 400. For example, the RF signals can first be transmitted by a sensing device (e.g., one of the access points 410, 412, 414, 416) or one transmitting antenna of a sensing device. The RF signals then can be received at another sensing device (e.g., another one of the access points 410, 412, 414, 416) or a receiving antenna of the sensing device depending on the configuration of devices within environment 400. RF data based on the received RF signals can then be sent to a position estimation system (not illustrated).

In some aspects, position estimation can be performed by one or more machine-learning models, for example, that are configured to receive the RF and to make inferences about the location of objects (e.g., one or more people) within the environment 400.

FIGS. 5A-5C are diagrams 510, 520, 530 illustrating examples of object detection utilizing a distributed sensing system. FIGS. 5A-5C can further illustrate motion detection and positioning across a building 502. For example, in diagram 510 of FIG. 5A, an object 512 (e.g., a person) is detected by a distributed sensing system (e.g., the distributed sensing system 400 of FIG. 4), as described herein. The object 512 is detected in a hallway 514 of a western portion of the building 502. As shown in diagram 520 of FIG. 5B, as the object 512 moves in an easterly direction, the object 512 enters a room 524 of the building 502. By utilizing sensing devices distributed throughout the building 502, the distributed sensing system can determine where the object 512 is located. Thereafter, as shown in diagram 530 of FIG. 5C, the object 512 moved from the room 524, into the hallway 514, and into another room 534. In the room 534, the distributed sensing system can detect the position of the object 512 in the room 534. For example, the object 512 in diagram 530 of FIG. 5C, the object 512 is detected to be in the south-easterly corner of the room 534.

The sensing devices (e.g., such as access points and/or wireless devices) of the distributed sensing system can also be utilized to receive and collect channel estimation information and data from the sensing devices. In some aspects, one or more devices, such as a user device or other device associated with a user in building 502, can be used to collect some labeling data. By way of example, the user may provide floor plan information, or labels indicating the relative locations of various rooms and/or wireless devices, such as access points (e.g., access points 410, 412, 414, 416, discussed above).

Figure 6:
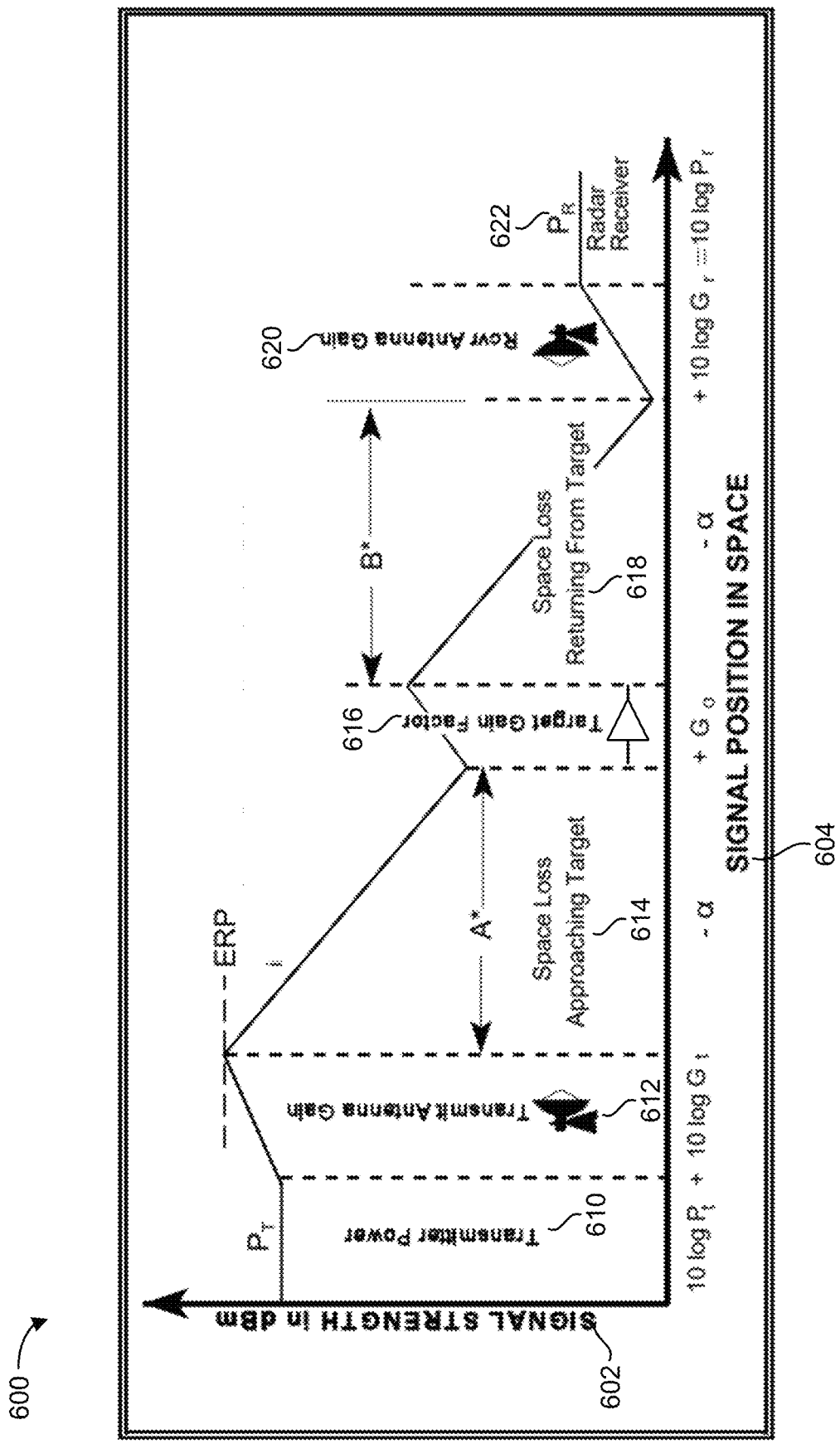
FIG. 6 is a diagram illustrating an example graph of signal strength versus signal position in space, in accordance with some examples.

In some implementations, to detect an event in an environment by the distributed sensing system, there may need to be a strong enough signal so that the reflected signal can reach the receiver of a sensing device of the distributed sensing system. As illustrated in FIG. 6, the strength of the signal can depend on at least the transmit power of the sensing device, the antenna gains of the sensing device, and the distance between the transmitter, the target, and the receiver. For example, the greater the transmit power, the more likely the reflected signal will reach the receiver of the corresponding sensing device. If the transmit power is too low, the reflected RF signal may be too low to be detected by the receiver of the sensing device. Similarly, if antenna gains are too low, the receiver may not sufficiently receive the reflected RF signal. Distance also affects the quality of transmitted signals and reflected signals. For example, the greater the distance between two sensing devices (e.g., pathloss) or the transmitter and receiver of the same sensing device, depending on the configuration of the distributed sensing system, the lower the signal strength will be for the RF signal and the reflected RF signal. Path loss (e.g., space loss 614, 618 of FIG. 6), or path attenuation, is the reduction in power density of an electromagnetic wave as the signal propagates through space. The strength of the signal can also depend on the type of target. For example, if a target is small in size (e.g., 1 inch in diameter, 3 inches in diameter, 6 inches in diameter, etc.), the surface area of the target may be small and thus only a small amount of RF signals may reflect off of the target. If the target is large in size, the target will have a large surface area that reflects a large amount of RF signals. Reflectivity of a target can be referred to as a radar cross section. The distributed sensing system can measure the strength of signals reflected from different objects. Based on the signals, reflected signals, and the strength of the signals, the distributed sensing system can predict aspects of the target, such as location and movement of the target. However, if the target is far from the sensing devices, the signals received by the distributed sensing system may be too weak to detect a location of the target or other aspect of the target. If the target is closer to the sensing devices, the signals reflected by the target may have enough signal strength for the distributed sensing system to make accurate detections.

FIG. 6 is a diagram illustrating an example graph 600 of signal strength 602 versus signal position in space 604 with respect to detecting an object. In some implementations, a distributed sensing system can detect events in an environment that can be represented as a function of signal strength (e.g., of radio frequency signals) received by a sensing device. The radio frequency signals can be generated as reflected radio frequency signals by a target sensing device. In some implementations, the signal strength of the radio frequency signals can be based on: transmission power; antenna gains; pathloss between a transmitter and a reflector, as a function of sensing devices and a target location; pathloss between the reflector and the receiver, as a function of the sensing devices and the target location; reflectivity of the target (e.g., radar cross section (RCS)); receiver specifications; any combination thereof; and/or other factors. In some cases, RCS can be determined as a function of the target size and/or shape. In some cases, antenna gains can be approximated by the distributed sensing system. The distributed sensing system can predict a received sensing signal caused by a target at a given location, such as based on received signal strength indicators (RSSIs), pathloss measurements, and/or other factors.

Referring to FIG. 6, the graph 600 illustrates transmitter power ($P_T$) 610, transmit antenna gain ($G_t$) 612, space loss 614 approaching target (a), target gain factor (GO 616, space loss 618 returning from target (a), receiver antenna gain ($G_r$) 620, and receiver power ($P_r$) 622. The distributed sensing system can further determine effective radiated power (ERP). For example, if power is measured in region A (e.g., the space loss approaching target 614) or region B (e.g., the space loss 618 returning from target), the power can be stated in either power density (mW/cm$^2$) or field intensity (V/m).

Signal strength versus signal position in space of FIG. 6 can be defined by the following equation: $10 \log P_t + 10 \log G_t - \alpha + 10 \log G_\sigma - \alpha + 10 \log G_r = 10 \log P_r$.

Figure 7:
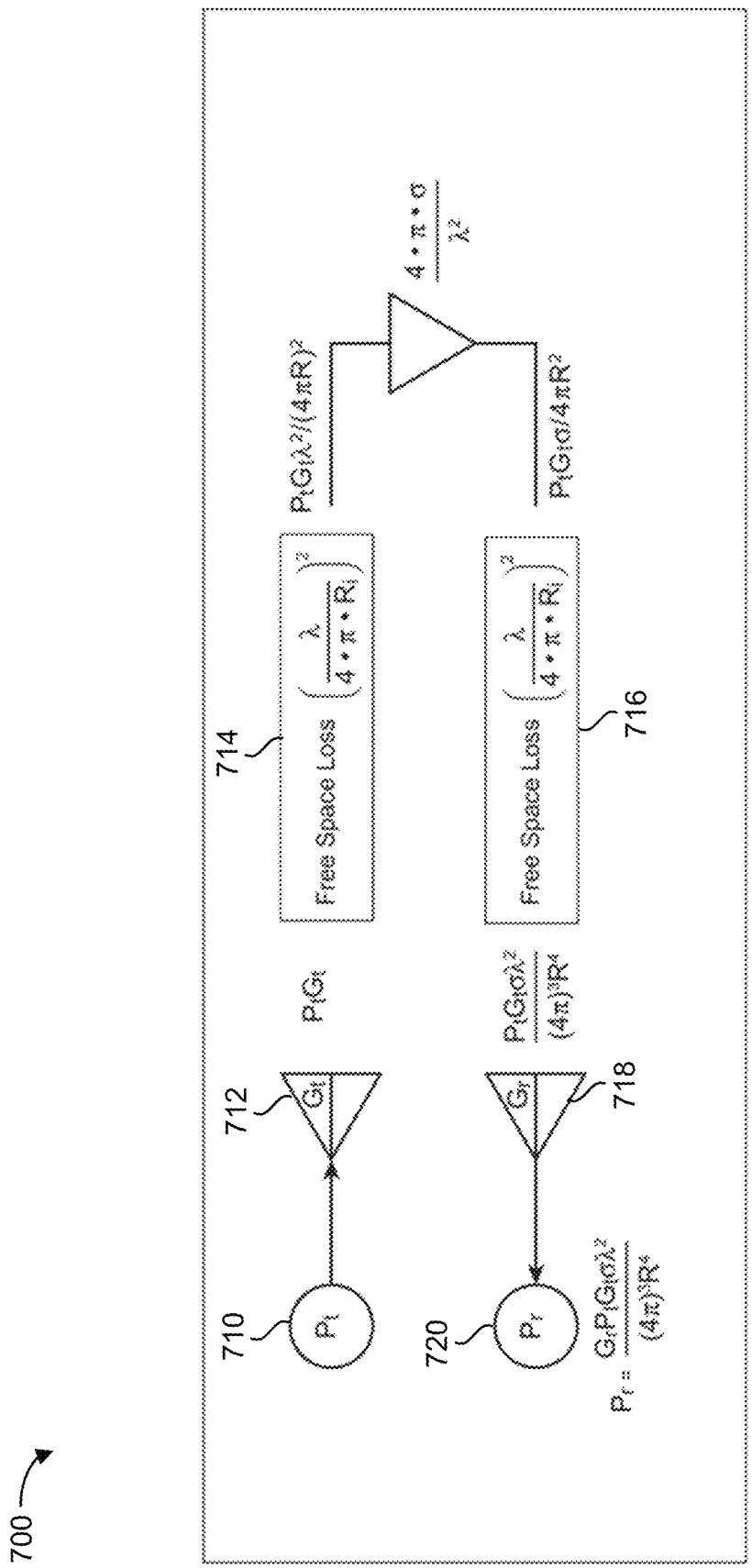
FIG. 7 is a diagram illustrating an example block diagram for radar cross section measurements, in accordance with some examples.

FIG. 7 is a diagram illustrating an example block diagram for radar cross section measurements 700. For example, radar cross section measurements can include transmitter power ($P_T$) 710, transmit antenna gain ($G_t$) 712, free space loss 714, 716

$$\left(\left(\frac{\lambda}{4 \cdot \pi \cdot R_i}\right)^2\right),$$

receiver antenna gain ($G_r$) 718, and receiver power ($P_r$) 720

$$\left(\text{e.g., } P_r = \frac{G_r P_t G_t \sigma \lambda^2}{(4\pi)^3 (R1^2 R2^2)}\right).$$

The radar cross section measurements 700 can further utilize the following equations: $P_t G_t \lambda^2/(4\pi R)^2$, $(4 \cdot \pi \cdot \sigma)/\lambda^2$, $P_t G_t \lambda^2 / 4\pi R^2$, and $P_t G_t \sigma \lambda^2/(4\pi)^3(R_1^2 R_2^2)$. $\lambda$ refers to a wavelength of a radio frequency signal. $R_i$ refers to a distance from a transmitter or receiver to a target. For instance, $R_1$ refers to a distance between a transmitter and a target, and $R_2$ refers to a distance between a target and a receiver. $\sigma$ refers to a radar cross section (RCS). Power and wavelengths of the radio frequency signals can also be adjusted by the distributed sensing system to optimize quality and range of the radio frequency signals.

Figure 8:
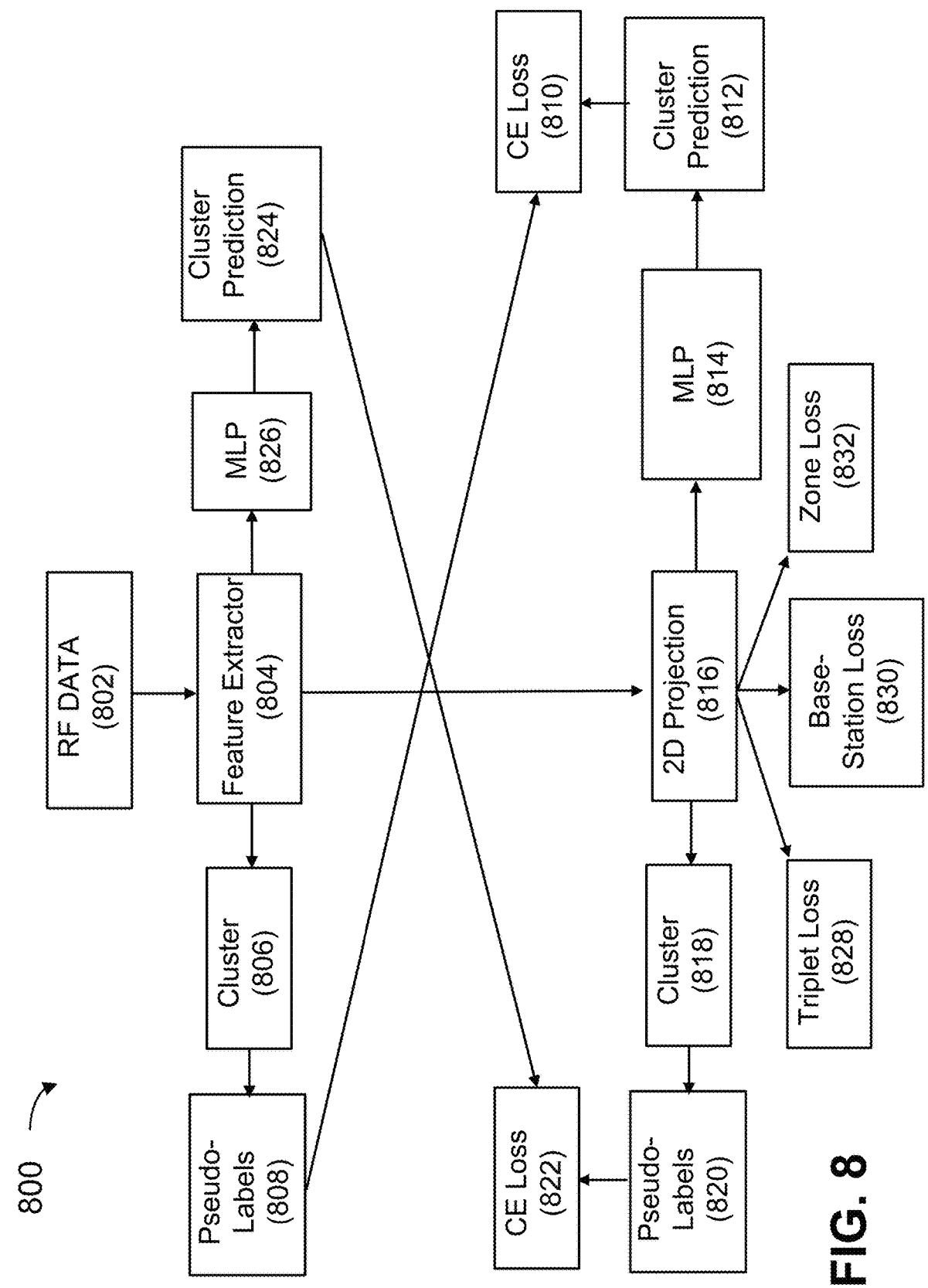
FIG. 8 is a diagram illustrating an example architecture of a self-supervised position estimation system, in accordance with some examples.

FIG. 8 is a diagram illustrating an example architecture of a self-supervised position estimation system 800, in accordance to some aspects of the disclosed technology. Position estimation system 800 can be configured to produce object location estimates given input RF data (CSI), for example, by utilizing representation learning and dimensionality reduction techniques to create a 2D latent-space that can be used to perform zone-level classification. As discussed in further detail below, dimensionality reduction techniques utilizing cross-dimension and multi-scale clustering can be implemented to preserve local and global structure within the data, and to facilitate the mapping of 2D latent-space representations into precise position estimates.

In operation, position estimation system 800 is configured to receive RF data (block 802), for example, that is associated with at least one wireless device in a given environment or location, such as in an indoor environment. By way of example, the RF data can be associated with an object (e.g., a person or user) in the environment of the wireless device for which position estimation is to be performed. In some examples, RF data is (or comprises) channel state information (CSI) measured by one or more wireless devices, such as access points 410-416, discussed above with respect to FIG. 4. In some aspects, the CSI provided as input to position estimation system 800 is pre-processed, for example, by applying a high-pass filter to isolate portions of the CSI signal that change over time. Depending on the desired implementation, various types (dimensions) of information from the CSI can be utilized for use in performing position estimation. By way of example, CSI can include but is not limited to: transmit antenna information, receive antenna information, sub-carrier information, velocity information, coverage area information, transmitter processing information, receiver processing information, or a combination thereof.

The CSI information is then provided to a feature extractor (block 804), for example, to extract one or more feature vectors. In some approaches, feature extraction can be accomplished using a neural-network (e.g., a first machine-learning model), such as a convolutional neural network (CNN) that is configured to generate feature vectors representing salient characteristics of input RF data. The dimension of the extracted feature vectors can vary depending on the dimensionality of RF data inputs and the configuration of the feature extractor (CNN). By way of example, the extracted feature vectors may include one or more 128-dimensional vectors (arrays). These high-dimensionality feature vectors are then processed to generate one or more clusters (block 806). Although different clustering techniques can be used depending on the desired implementation, in some aspects a k-means clustering approach is used to create pseudo-labels (block 808). In some aspects, dimensionality reduction is performed to generate the clusters (block 806). In such approaches, a number of clusters resulting from (or generated by) the feature extractor (block 804) can depend on a parameter, e.g., a cluster count parameter indicating a dimensionality for the resulting clusters and the pseudo-labels. In some aspects, the dimensionality may depend on the size of the space in which location estimation is performed; for example, there may be a greater number of clusters for larger spaces, or for which a greater number of zones are believed to be present. The pseudo-labels (e.g., high-dimensional pseudo-labels), can then be used to train a first machine-learning model, and using a multilayer perceptron (MLP) (block 814), to back-propagate the cross-entropy loss (block 810), for cluster predictions (block 812) made by the first ML model (block 814).

In some aspects, extracted features (block 804) are also processed to produce two-dimensional (2D) projections (block 816), for example, that represent a 2D latent-space corresponding with the environment from which the RF data (block 802) was collected. In some examples, the 2D projections (block 816) can also be clustered (block 818) to generate pseudo-labels, (e.g., 2D pseudo labels) (block 820). In some aspects, pseudo-labels 820 can be based on priors (e.g., labeling information), for example, that are provided by a user associated with the received RF data (802). The priors can include information regarding a topology of the environment in which location estimation is to be performed. By way of example, the priors may include information about the location of one or more wireless devices (e.g., access points) in the environment, floor-plan information, and/or labels, such as labels indicating zones or rooms in the sensed environment.

Using a cross entropy loss function (block 822), the 2D pseudo-labels (block 820), can be used to train a second machine-learning model (block 826), for example, that is configured to make cluster predictions (block 824), based on the extracted feature vectors (block 804). In some aspects, the 2D latent space (block 816) that is generated from the cross-training ML architecture described above, can be used to make precise location estimates for one or more objects associated with the RF data (CSI) received by the estimation system 800 (block 802).

In some aspects, location estimates determined from the 2D projections (block 816) are further based on additional loss functions, including, but not limited to a triplet-loss (block 828), an access-point loss (which can also be referred to as a base-station loss) (block 830), a zone-loss (832), or a combination thereof. In some aspects, the triplet-loss can be based on a temporal characteristic or dimension corresponding with a wireless device associated with the RF data, such as, one or more of access points 410-414, discussed above with respect to FIG. 4. For instance, the triplet-loss of two packets that are temporally close (and that are similar or dissimilar) is low when they are close in the latent space. In one illustrative example, the triplet-loss can use temporal information only. For instance, positive anchors can be selected as CSI-samples that are within a first period of time (e.g., 1 second, 2 seconds, 3 seconds, or other time period) of the anchor, and negative anchors can be selected as CSI-samples that are within a second period of time (e.g., within 2-4 seconds when the first period of time is 2 seconds, or other period of time) of the anchor. In such an illustrative example, the triplet-loss can result in a latent representation that will encode packets closer in time as being closer in the latent-space.

In some aspects, the triplet-loss can be calculated using the relationship of equation (3):

$$\frac{1}{N} \sum_{(i,j,k) \in \mathcal{T}} \max(0, (d(x_i, x_j) - d(x_i, x_k) + M_t)) \qquad (3)$$

where $x_i$, are anchors, $x_j$ designates a positive sample, and $x_k$ designates a negative sample. In some examples, the Euclidian distance between representations, can be given by the relationship of equation (4):

$$d(x,x') = \|f_\theta(x')\| \qquad (4)$$

where the hyper-parameter $M_t$, from equation (3), can represent the margin, e.g., the minimum gap between distances that reduces the loss to zero.

In some aspects, the zone-loss can be based at least in part on the zone labels. The zone loss may measure the accuracy of correspondence between the predicted zone classification based on the received RF data samples (or packets), and the respective true zone indicated by a provided zone indicator on a Cartesian map representing the associated environment.

For instance, the zone-loss can assign or determine a high loss value (and thus penalize) for zone classifications that are indicated as belonging to a different zone by one or more room or zone indicators, and can assign or determine a low loss value for zone classifications that are correct based on one or more room or zone indicators. In some approaches, a zone prediction can be determined for each received RF sample based on one or more priors, such as information about the associated floor-plan (for an indoor environment) and the latent-space representation. By way of example, zone predictions can be based on a K-nearest neighbors (KNN) lookup to generate a predicted zone, corresponding with a given bounding box B. In some aspects, the zone-loss equates to the Manhattan distance $d_m$ between the box B and the locus (point) predicted for the RF sample (packet), if the point is predicted to be outside the bounding box, and zero otherwise. In some implementations, the zone-loss can be calculated using the relationship of equation (5):

$$\frac{1}{N}\sum_{i=1}^{N} \max(0, d_m(x_i, B)) \tag{5}$$

In some aspects, the access-point loss can be based on at least one of a signal strength, a location, or a combination thereof, for a wireless device associated with the RF data. Further to the example, provided above with respect to FIG. 4, the access-point loss may be based on one or more priors provided by the user 416 regarding the placement (locations) of one or more access points or base stations in the environment 400. For example, for each packet in a batch, a negative-anchor packet is sampled that is far-enough in distance to have a difference in power, but close enough that it lies in the same zone. For each access-point a from a set of access-points A, a difference in power can be calculated. In some approaches, if the calculated difference in power is greater than a threshold value, then the packet with a higher power $(x_i)$ should be closer to the respective host by a hyper-parameter $M_a$ than the packet with the lower power $(x_k)$. In some approaches, for both the triplet-loss and the access-point loss, the margins $M_t$ and $M_a$ can correspond to the desired difference in Euclidean distance on the Cartesian map and can be tuned to reflect the speed of the tracked object (e.g., person) and the timestamp difference. In some implementations, the access-point loss can be given by the relationship of equation (6):

$$\frac{1}{N}\sum_{(i,k)\in\mathcal{T}}\sum_{n\in\mathcal{A}} \max(0, (d(x_i, a) - d(x_k, a) + M_a)) \tag{6}$$

In some approaches, the access-point loss can help to pull location predictions on the latent-space closer to the real-space and can also help the model know the correct orientation for some rooms.

In some examples, the cluster loss, the triplet loss, the zone loss, and access-point loss can be combined to generate a loss function used for training the first and second neural networks. As an example, the losses can be combined by means of a weighted sum operation. In such an example, the weighted sum of the cluster loss, the triplet loss, the zone loss, and access-point loss can be used to train the first and second neural networks.

Figure 9:
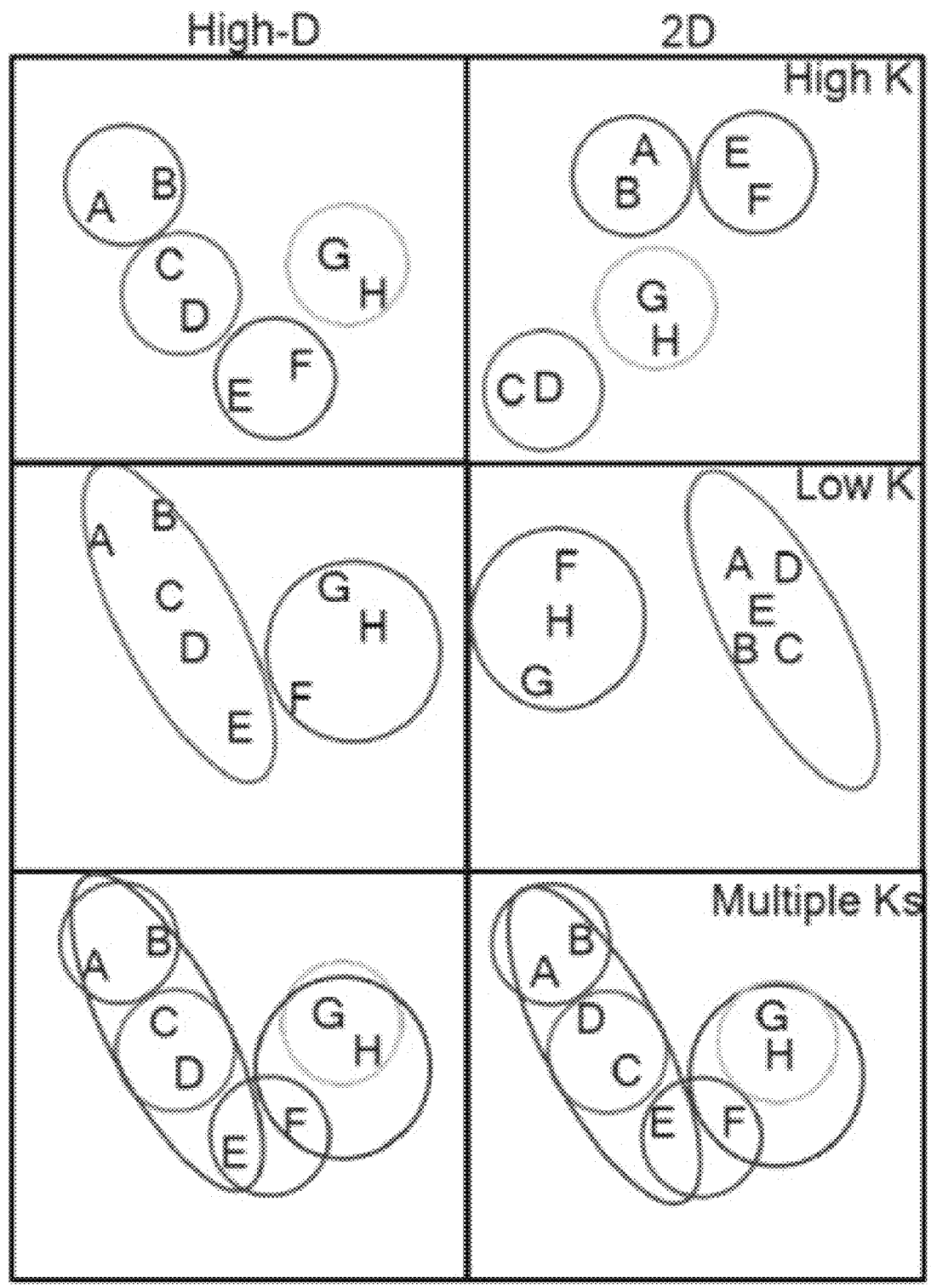
FIG. 9 is a diagram illustrating an example of clusters that can be used to generate pseudo-labels for a self-supervised position estimation system, in accordance with some examples.

FIG. 9 is a diagram illustrating an example of clusters that can be used to generate pseudo-labels for a self-supervised position estimation system, such as location estimation system 800, discussed above. As illustrated, the diagram of FIG. 9 shows examples of clustering assignments that can be made for high-dimensionality feature vectors (High-D), as well as 2D projections (2D), as discussed above with respect to FIG. 8.

In some aspects, as the number of clusters is increased, the size of the neighborhoods can also decrease (e.g., as shown in FIG. 9, for "high K," the number of letters in each bubble is small (corresponding to small neighborhood), and for "low K," the number of letters in a bubble is larger (corresponding to a large neighborhood) than that of the "high K"). For example, if it is assumed that a very high number of clusters is produced such that, on average, two points form a cluster in the high-D representation, then the 2D latent-space can preserve the (local) nearest-neighbor. On the other hand, if it is assumed that several clusters are present, then the 2D latent-space can preserve a more global structure such as which rooms the samples originate from. In some examples, to enforce structure at multiple scales, instead of working with just one set of clusters, a hierarchy of cluster assignments can be extracted and predicted, as discussed above.

Figure 10:
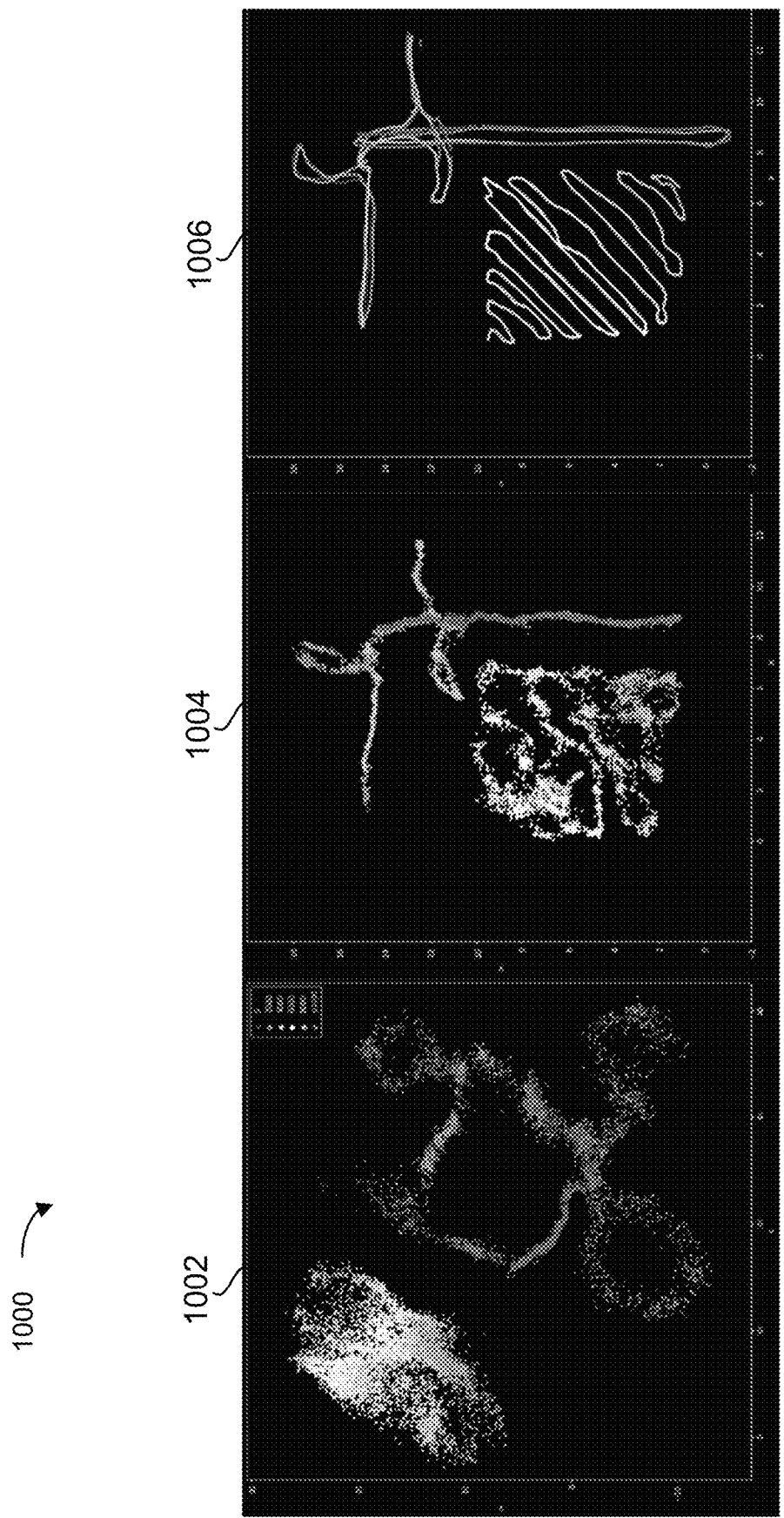
FIG. 10 is a diagram illustrating an example of a comparison between a two-dimensional latent space, a Cartesian map, and corresponding ground-truth data for a geographic environment, in accordance with some examples.

FIG. 10 is a diagram illustrating an example of a comparison between a two-dimensional latent space 1002, a Cartesian map 1004, and corresponding ground-truth data for a geographic environment 1006. In particular, the 2D latent space 1002 illustrates an example using only triplet and cluster loss, whereas the illustrated Cartesian map incorporates some priors (e.g., zone-level labels and floor-plan information).

Figure 11:
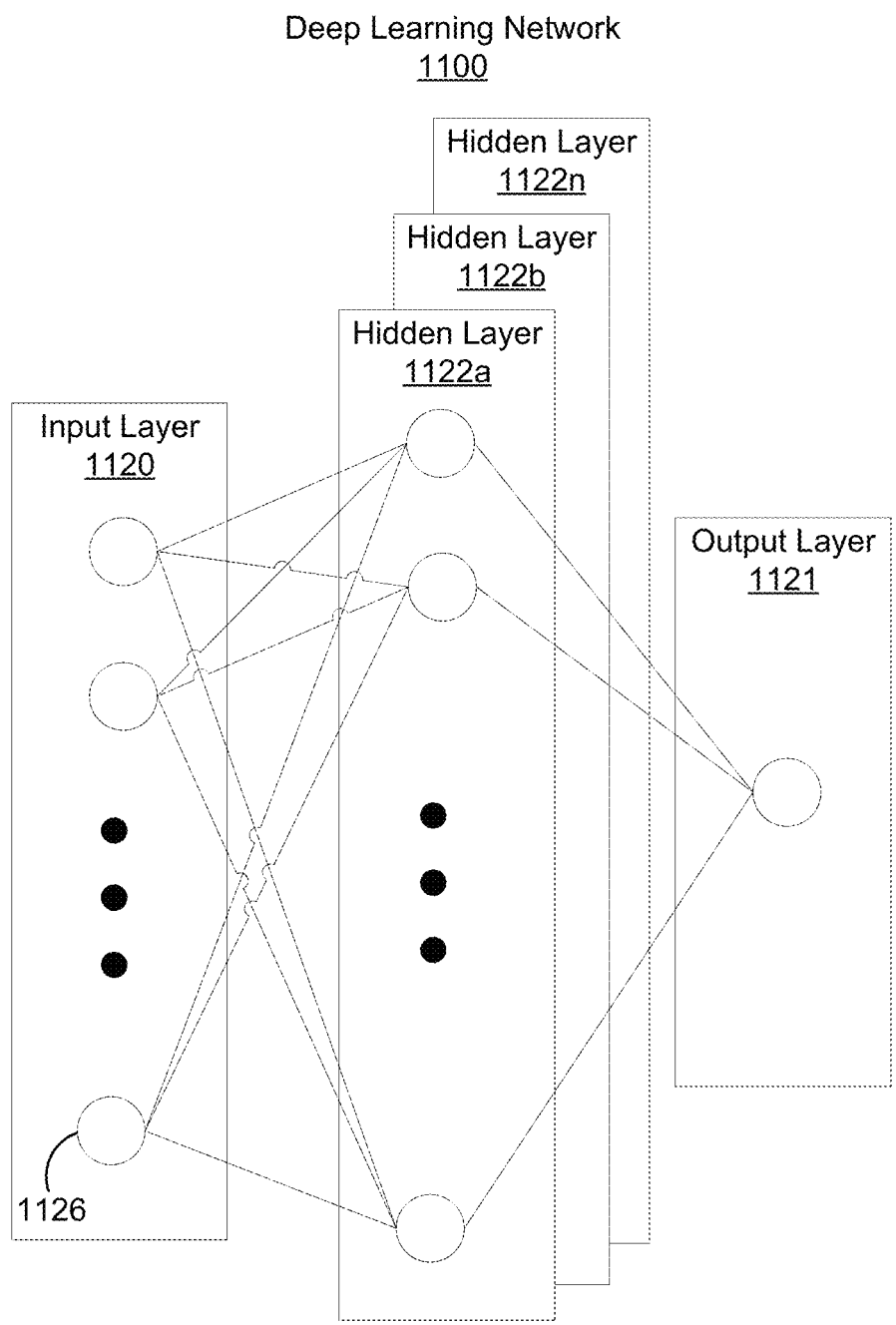
FIG. 11 is a block diagram illustrating an example of a deep learning neural network, in accordance with some examples.

FIG. 11 is an illustrative example of a deep learning neural network 1100 that can be used to implement the distributed sensing system described above. An input layer 1120 includes input data. In one illustrative example, the input layer 1120 can include data representing the pixels of an input video frame. The neural network 1100 includes multiple hidden layers 1122a, 1122b, through 1122n. The hidden layers 1122a, 1122b, through 1122n include "n" number of hidden layers, where "n" is an integer greater than or equal to one. The number of hidden layers can be made to include as many layers as needed for the given application. The neural network 1100 further includes an output layer 1121 that provides an output resulting from the processing performed by the hidden layers 1122a, 1122b, through 1122n. In one illustrative example, the output layer 1121 can provide a classification for an object in an input video frame. The classification can include a class identifying the type of activity (e.g., playing soccer, playing piano, listening to piano, playing guitar, etc.).

The neural network 1100 is a multi-layer neural network of interconnected nodes. Each node can represent a piece of information. Information associated with the nodes is shared among the different layers and each layer retains information as information is processed. In some cases, the neural network 1100 can include a feed-forward network, in which case there are no feedback connections where outputs of the network are fed back into itself. In some cases, the neural network 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122a. For example, as shown, each of the input nodes of the input layer 1120 is connected to each of the nodes of the first hidden layer 1122a. The nodes of the first hidden layer 1122a can transform the information of each input node by applying activation functions to the input node information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1121, at which an output is provided. In some cases, while nodes (e.g., node 1126) in the neural network 1100 are shown as having multiple output lines, a node has a single output and all lines shown as being output from a node represent the same output value.

In some cases, each node or interconnection between nodes can have a weight that is a set of parameters derived from the training of the neural network 1100. Once the neural network 1100 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1100 to be adaptive to inputs and able to learn as more and more data is processed.

The neural network 1100 is pre-trained to process the features from the data in the input layer 1120 using the different hidden layers 1122a, 1122b, through 1122n in order to provide the output through the output layer 1121. In an example in which the neural network 1100 is used to identify activities being performed by a driver in frames, the neural network 1100 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1100 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1100 is trained well enough so that the weights of the layers are accurately tuned.

For the example of identifying objects in frames, the forward pass can include passing a training frame through the neural network 1100. The weights are initially randomized before the neural network 1100 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (e.g., red, green, and blue, or luma and two chroma components, or the like).

As noted above, for a first training iteration for the neural network 1100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1100 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target-output)^2)$. The loss can be set to be equal to the value of $E\_total$.

The loss (or error) will be high for the first training samples since the actual values will be much different than the predicted output. The goal of training is to minimize the amount of loss so that the predicted output is the same as the training label. The neural network 1100 can perform a backward pass by determining which inputs (weights) most contributed to the loss of the network, and can adjust the weights so that the loss decreases and is eventually minimized. A derivative of the loss with respect to the weights (denoted as $dL/dW$, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w\_i - \eta dL/dW$, where w denotes a weight, wi denotes the initial weight, and $\eta$ denotes a learning rate. The learning rate can be set to any suitable value, with a high learning rate including larger weight updates and a lower value indicating smaller weight updates.

The neural network 1100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1100 can include any other deep network other than a CNN, such as an autoencoder, a deep belief nets (DBNs), a Recurrent Neural Networks (RNNs), among others.

Figure 12:
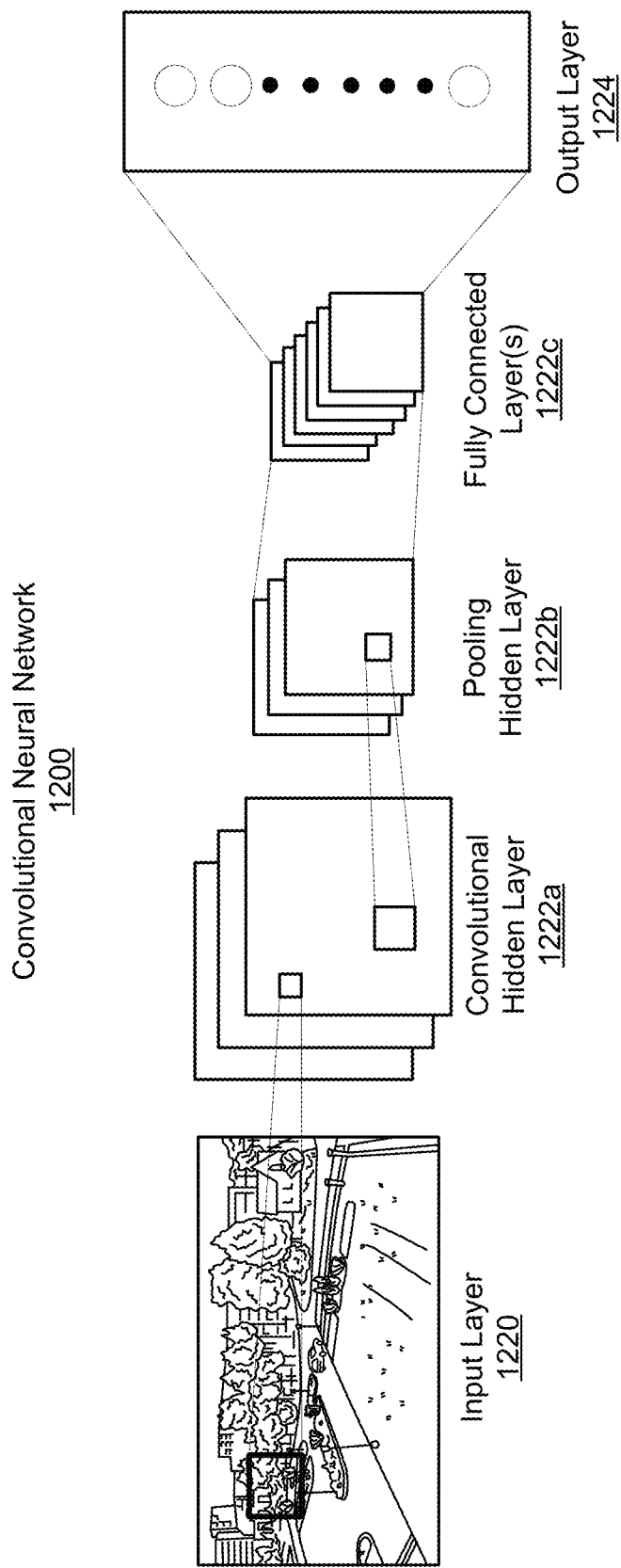
FIG. 12 is a block diagram illustrating an example of a convolutional neural network (CNN), in accordance with some examples.

FIG. 12 is an illustrative example of a convolutional neural network (CNN) 1200. The input layer 1220 of the CNN 1200 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1222a, an optional non-linear activation layer, a pooling hidden layer 1222b, and fully connected hidden layers 1222c to get an output at the output layer 1224. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image.

The first layer of the CNN 1200 is the convolutional hidden layer 1222a. The convolutional hidden layer 1222a analyzes the image data of the input layer 1220. Each node of the convolutional hidden layer 1222a is connected to a region of nodes (pixels) of the input image called a receptive field. The convolutional hidden layer 1222a can be considered as one or more filters (each filter corresponding to a different activation or feature map), with each convolutional iteration of a filter being a node or neuron of the convolutional hidden layer 1222a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1222a. Each connection between a node and a receptive field for that node learns a weight and, in some cases, an overall bias such that each node learns to analyze its particular local receptive field in the input image. Each node of the hidden layer 1222a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1222a is due to each node of the convolutional layer being applied to its corresponding receptive field. For example, a filter of the convolutional hidden layer 1222a can begin in the top-left corner of the input image array and can convolve around the input image. As noted above, each convolutional iteration of the filter can be considered a node or neuron of the convolutional hidden layer 1222a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1222a. For example, a filter can be moved by a step amount (referred to as a stride) to the next receptive field. The stride can be set to 1 or another suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1222a.

The mapping from the input layer to the convolutional hidden layer 1222a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1222a can include several activation maps in order to identify multiple features in an image. The example shown in FIG. 12 includes three activation maps. Using three activation maps, the convolutional hidden layer 1222a can detect three different kinds of features, with each feature being detectable across the entire image.

In some examples, a non-linear hidden layer can be applied after the convolutional hidden layer 1222a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1200 without affecting the receptive fields of the convolutional hidden layer 1222a.

The pooling hidden layer 1222b can be applied after the convolutional hidden layer 1222a (and after the non-linear hidden layer when used). The pooling hidden layer 1222b is used to simplify the information in the output from the convolutional hidden layer 1222a. For example, the pooling hidden layer 1222b can take each activation map output from the convolutional hidden layer 1222a and generates a condensed activation map (or feature map) using a pooling function. Max-pooling is one example of a function performed by a pooling hidden layer. Other forms of pooling functions be used by the pooling hidden layer 1222a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1222a. In the example shown in FIG. 12, three pooling filters are used for the three activation maps in the convolutional hidden layer 1222a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1222a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1222a having a dimension of 24×24 nodes, the output from the pooling hidden layer 1222b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1222b to every one of the output nodes in the output layer 1224. Using the example above, the input layer includes 28×28 nodes encoding the pixel intensities of the input image, the convolutional hidden layer 1222a includes 3×24×24 hidden feature nodes based on application of a 5×5 local receptive field (for the filters) to three activation maps, and the pooling hidden layer 1222b includes a layer of 3×12× 12 hidden feature nodes based on application of max-pooling filter to 2×2 regions across each of the three feature maps. Extending this example, the output layer 1224 can include ten output nodes. In such an example, every node of the 3×12×12 pooling hidden layer 1222b is connected to every node of the output layer 1224.

The fully connected layer 1222c can obtain the output of the previous pooling hidden layer 1222b (which should represent the activation maps of high-level features) and determines the features that most correlate to a particular class. For example, the fully connected layer 1222c layer can determine the high-level features that most strongly correlate to a particular class, and can include weights (nodes) for the high-level features. A product can be computed between the weights of the fully connected layer 1222c and the pooling hidden layer 1222b to obtain probabilities for the different classes. For example, if the CNN 1200 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1224 can include an M-dimensional vector (in the prior example, M=10). M indicates the number of classes that the CNN 1200 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0 0.15 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 13:
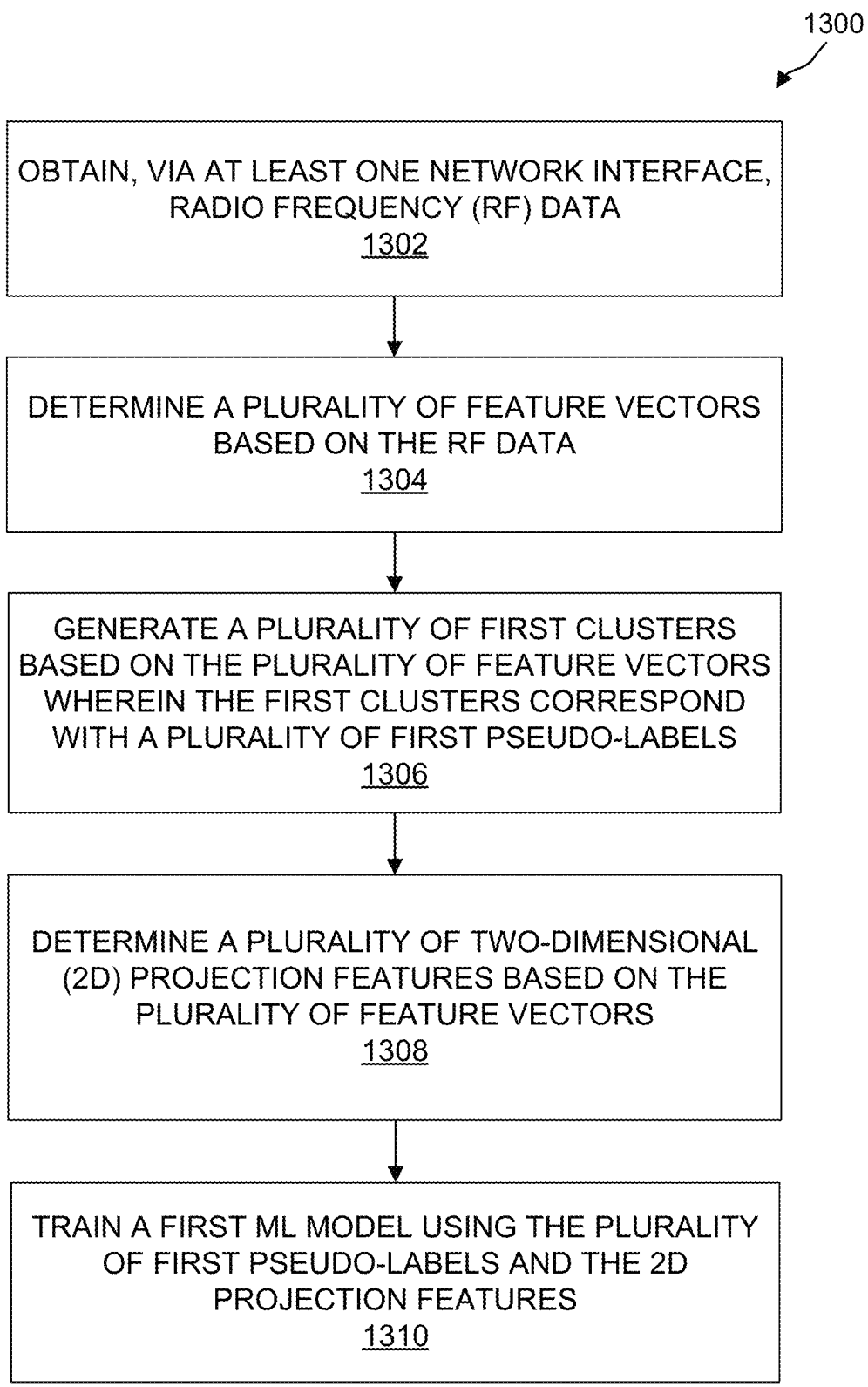
FIG. 13 illustrates an example flow diagram of a process for training one or more sensing models, in accordance with some examples.

FIG. 13 illustrates an example flow diagram of a process 1300 for performing location prediction, in accordance with some examples of the present disclosure. At operation 1302, the process 1300 can include obtaining, via the at least one network interface, radio frequency (RF) data. As discussed above, the RF data can include (or can be) Channel State Information (CSI). In some aspects, the CSI can include at least one of: transmit antenna information, receive antenna information, sub-carrier information, velocity information, coverage area information, transmitter processing information, receiver processing information, or a combination thereof.

At operation 1304, the process 1300 can include determining a plurality of feature vectors based on the RF data. In some implementations, the feature vectors can be extracted by a feature extractor, such as a convolutional neural network (CNN), as discussed above with respect to FIG. 8. The feature vectors can provide a high-dimensional (e.g., 128D) representation of received CSI information.

At operation 1306, the process 1300 can include generating a plurality of first clusters based on the plurality of feature vectors, wherein the first clusters correspond with a plurality of first pseudo-labels. In some aspects, cluster generation may be based on one or more configuration parameters, such as a cluster count parameter that indicates an amount of dimensionality reduction. By way of example, the cluster count parameter may be a pre-configured parameter that is based on the location or type of environment in which location estimation is performed.

At operation 1308, the process 1300 can include determining a plurality of two-dimensional (2D) projection features based on the plurality of feature vectors. At operation 1310, the process 1300 can include training a first ML model using the plurality of first pseudo-labels and the 2D projection features. In some aspects, the 2D projection features can be processed to generate a plurality of second clusters, and the second clusters can correspond with a plurality of second pseudo-labels. In some examples, the second pseudo labels can be used to train a second ML model. For example, the process 1300 can include training the second ML model based on the second pseudo-labels.

In some approaches, the 2D projection features can be used for predicting a location of a user. For example, a user location or a location for one or more other objects can be predicted with respect to various zones or rooms of an indoor space. In some examples, the second pseudo-labels can be based on one or more user-provided priors, such as room indicators, zone indicators, and/or floor-plan information, or a combination thereof. In some aspects, the second pseudo labels can be used to train the first ML model.

In some examples, the processes described herein (e.g., processes 1300, 1400 and/or other process described herein) may be performed by a computing device or apparatus. In one example, processes 1300 and/or 1400 can be performed by a computing device or the computing system 1500 shown in FIG. 15.

The computing device can include any suitable UE or device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1300. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), Vision Processing Units (VPUs), Network Signal Processors (NSPs), microcontrollers (MCUs) and/or other suitable electronic circuits), and/or can include and/or be implemented using computer software, firmware, or any combination thereof, to perform the various operations described herein.

The process 1300 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
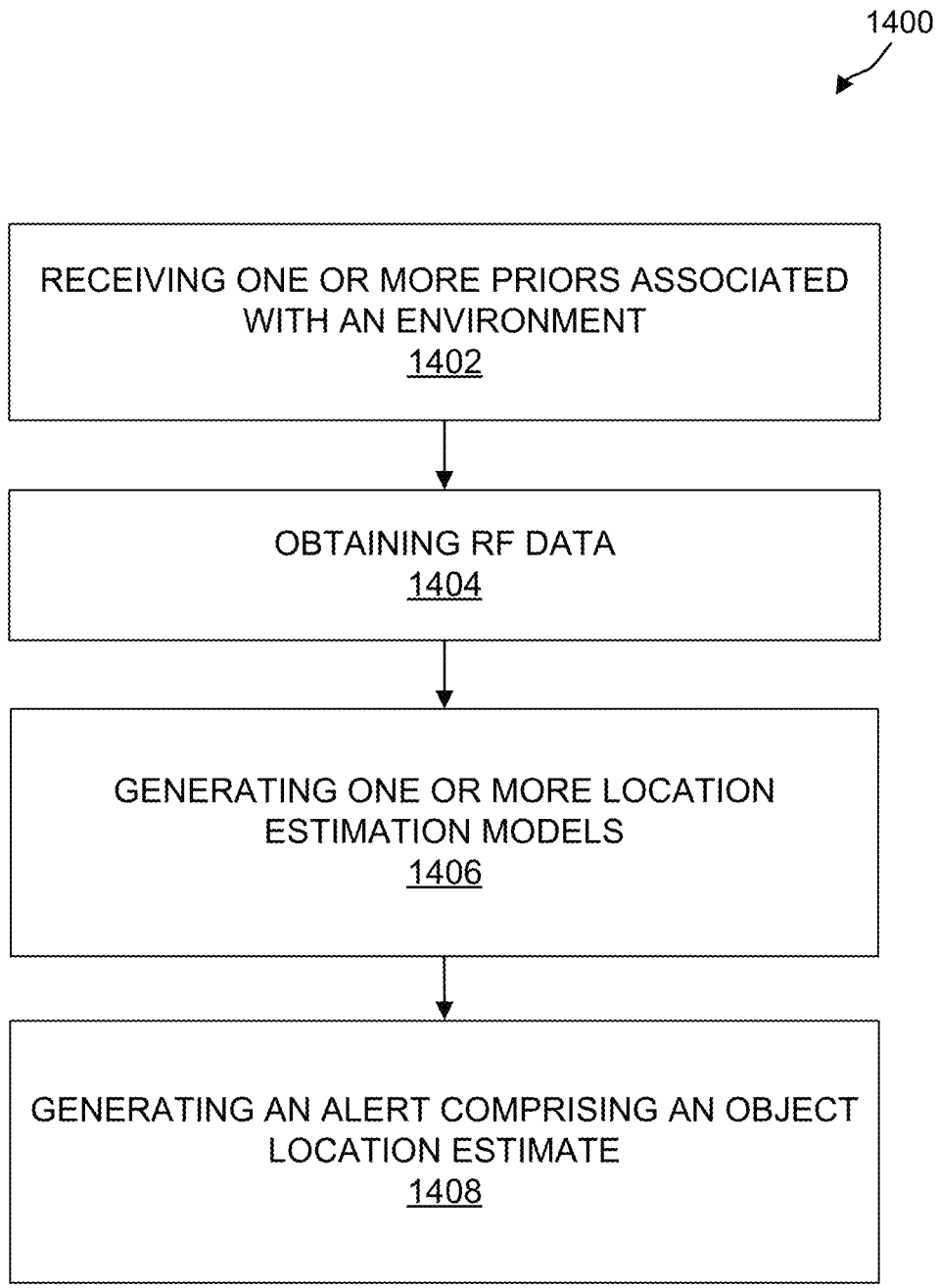
FIG. 14 illustrates an example flow diagram of a process for initiating a training procedure and location estimation process, in accordance with some examples.

FIG. 14 illustrates an example flow diagram of a process 1400 for initiating a training procedure and location estimation process, according to some aspects of the disclosed technology. At operation 1402, the process 1400 includes receiving one or more priors associated with an environment. In some aspects, priors can include various types of information about the environment, such as location or placement information for one or more wireless devices or access points within a floor-plan of an indoor environment. In some implementations, the priors can include room or zone indicators, such as tags or other indicators that designate a room type (e.g., "kitchen", or "garage"). As noted above, the room or zone indicators can be associated with CSI data obtained while a user is located in a particular room or zone of a venue. In some aspects, priors may include labels or other information, such as sketches of a floor plan, that indicate the relative placement of rooms or zones of an interior space in relation to one another. Depending on the desired implementation the priors may be received (e.g., at a server, access point/base station) via a device that is associated with user, such as a smart phone or other mobile device.

At operation 1404, the process 1400 includes obtaining RF data. In some examples, the RF data can be associated with one or more wireless devices (e.g., access points or base stations) that are located in, around, or proximate to an environment for which location estimation is to be performed. In some aspects, the RF data can include or may represent Channel State Information (CSI) for RF signals that are transmitted between two or more devices (e.g., transmitter and receivers). As such, the RF data can include data regarding signal perturbations, for example, that are associated with the placement and/or motion of objects in the environment. By way of example, the RF data can include CSI corresponding with RF signal perturbations caused by motion of a person (e.g., a user) through one or more rooms of an indoor environment.

At operation 1406, the process 1400 includes generating one or more location estimation models, for example, that are configured to facilitate location determinations for one or more objects in the environment. As discussed above, the one or more location estimation models can include machine-learning models that are configured to receive, or take as input, RF data associated with an environment, and to provide processing (e.g., clustering and classification) necessary to make object location estimates for various objects in the environment. By way of example, the one or more location estimation models may be configured to generate a 2D latent space that can be represent a topography of an associated indoor environment, and that can be used to generate object location estimates or predictions. In some aspects, the location estimation models may be configured to detect or identify motion profiles of objects, such as identifying events or actions performed in the environment based on the motion of various animate or inanimate objects.

At operation 1408, the process 1400 includes generating an alert comprising an object location estimate. In some examples, the alert can include information that describes the presence and/or location of one or more objects in an environment. By way of example, the alert may be provided as an intrusion alert, e.g., to alert home owners and/or security personnel as to the presence of people (or other objects) in the vicinity of a home or business environment. In some aspects, the alerts may be transmitted to a device (e.g., a UE or smart phone) corresponding with the intended recipient. Depending on the desired implementation, the alerts can be configured to provide audible, visual, and/or tactile notifications to a user associated with the receiving device (e.g., smart phone).

Figure 15:
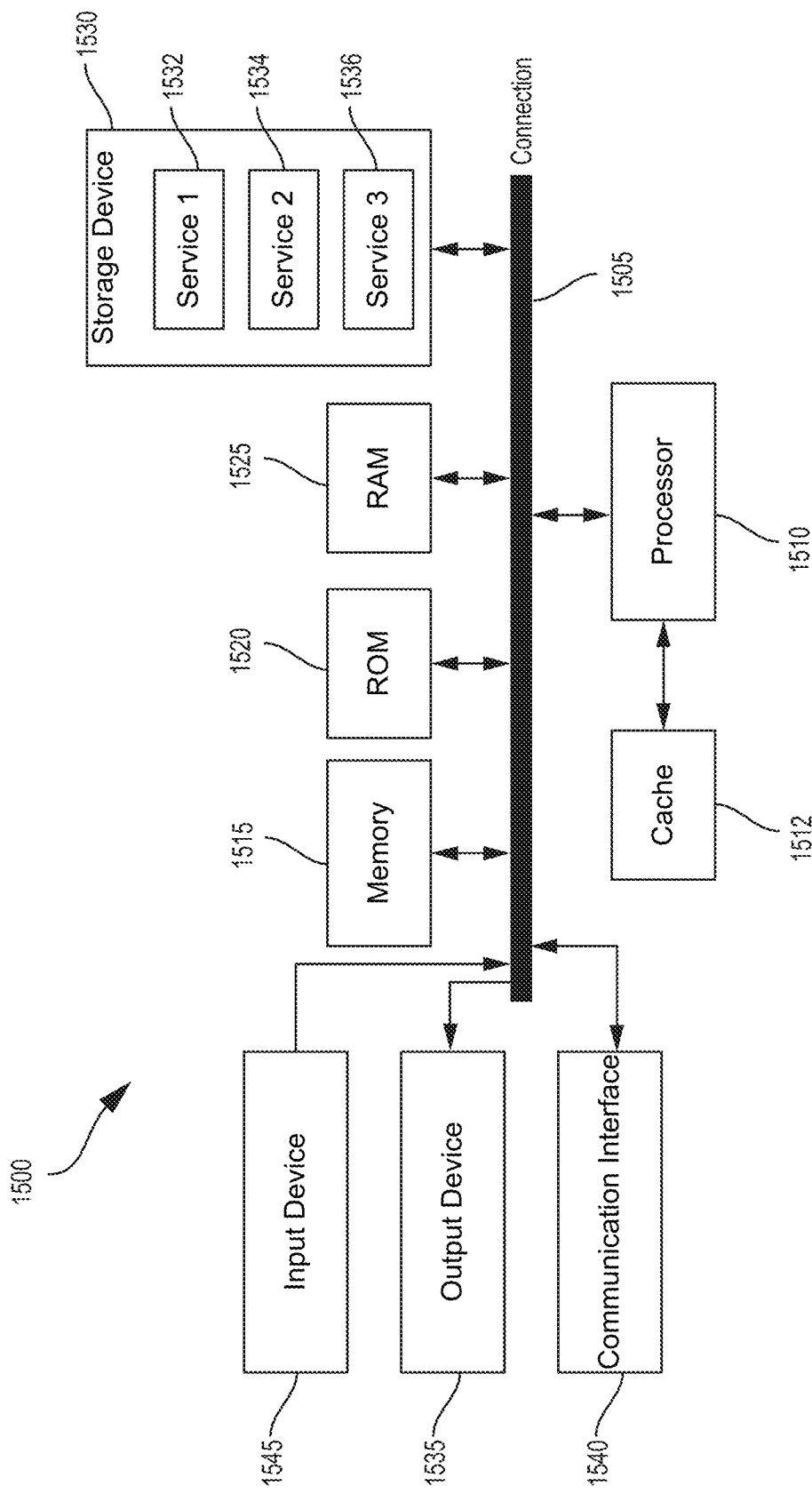
FIG. 15 illustrates an example computing system, in accordance with some examples.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including system memory 1515, such as read-only memory (ROM) 1520 and random-access memory (RAM) 1525 to processor 1510. Computing system 1500 can include a cache 1512 of high-speed memory connected directly with, in close proximity to, or integrated as part of processor 1510.

Processor 1510 can include any general-purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative examples and embodiments of the application have been described in detail herein, it is to be understood that inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the present disclosure include:

Aspect 1: An apparatus for performing location prediction, the apparatus comprising: at least one network interface; at least one memory; and at least one processor coupled to the at least one memory. The at least one processor is configured to: obtain, via the at least one network interface, radio frequency (RF) data; determine a plurality of feature vectors based on the RF data; generate a plurality of first clusters based on the plurality of feature vectors, wherein the plurality of first clusters correspond with a plurality of first pseudo-labels; determine a plurality of two-dimensional (2D) projection features based on the plurality of feature vectors; and train a first machine learning (ML) model using the plurality of first pseudo-labels and the 2D projection features.

Aspect 2: The apparatus of claim 1, wherein the at least one processor is further configured to: process the plurality of 2D projection features to generate a plurality of second clusters, wherein the second clusters correspond with a plurality of second pseudo-labels.

Aspect 3: The apparatus of claim 2, wherein the at least one processor is further configured to: train a second ML model based on the second pseudo-labels.

Aspect 4: The apparatus of any one of claims 1 to 3, wherein the at least one processor is further configured to: predict a location of a user based on the plurality of 2D projection features.

Aspect 5: The apparatus of any one of claims 1 to 4, wherein the at least one processor is further configured to: receive one or more labeling priors corresponding with an environment associated with the RF data.

Aspect 6: The apparatus of any one of claims 1 to 5, wherein, to generate the plurality of first clusters, the at least one processor is configured to: receive a cluster count parameter.

Aspect 7: The apparatus of any one of claims 1 to 6, wherein the 2D projection features are based on at least one of: a triplet-loss, an access-point loss, a zone-loss, or a combination thereof.

Aspect 8: The apparatus of claim 7, wherein the triplet-loss is based on a similarity of packets corresponding with a wireless device associated with the RF data.

Aspect 9: The apparatus of any one of claim 7 or 8, wherein the zone-loss is based on one or more priors for an environment associated with the RF data.

Aspect 10: The apparatus of any one of claims 7 to 9, wherein the access-point loss is based on at least one of a signal strength, a location, or a combination thereof, for a wireless device associated with the RF data.

Aspect 11: The apparatus of any one of claims 1 to 10, wherein the RF data comprises Channel State Information (CSI).

Aspect 12: The apparatus of claim 11, wherein the CSI comprises at least one of: transmit antenna information, receive antenna information, sub-carrier information, velocity information, coverage area information, transmitter processing information, receiver processing information, or a combination thereof.

Aspect 13: A method for performing location prediction, the method comprising: obtaining radio frequency (RF) data; determining a plurality of feature vectors based on the RF data; generating a plurality of first clusters based on the plurality of feature vectors, wherein the plurality of first clusters correspond with a plurality of first pseudo-labels; determining a plurality of two-dimensional (2D) projection features based on the plurality of feature vectors; and training a first machine learning (ML) model using the plurality of first pseudo-labels and the 2D projection features.

Aspect 14: The method of claim 13, further comprising: processing the plurality of 2D projection features to generate a plurality of second clusters, wherein the second clusters correspond with a plurality of second pseudo-labels.

Aspect 15: The method of claim 14, further comprising: training a second ML model based on the second pseudo-labels.

Aspect 16: The method of any one of claims 13 to 15, further comprising: predicting a location of a user based on the plurality of 2D projection features.

Aspect 17: The method of any one of claims 13 to 16, further comprising: receiving one or more labeling priors corresponding with an environment associated with the RF data.

Aspect 18: The method of any one of claims 13 to 17, wherein generating the plurality of first clusters, further comprises: receiving a cluster count parameter.

Aspect 19: The method of any one of claims 13 to 18, wherein the 2D projection features are based on at least one of: a triplet-loss, an access-point loss, a zone-loss, or a combination thereof.

Aspect 20: The method of claim 19, wherein the triplet-loss is based on a similarity of packets corresponding with a wireless device associated with the RF data.

Aspect 21: The method of any one of claim 19 or 20, wherein the zone-loss is based on one or more priors for an environment associated with the RF data.

Aspect 22: The method of any one of claims 19 to 21, wherein the access-point loss is based on at least one of a signal strength, a location, or a combination thereof, for a wireless device associated with the RF data.

Aspect 23: The method of any one of claims 13 to 22, wherein the RF data comprises Channel State Information (CSI).

Aspect 24: The method of any one of claims 13 to 23, wherein the CSI comprises at least one of: transmit antenna information, receive antenna information, sub-carrier information, velocity information, coverage area information, transmitter processing information, receiver processing information, or a combination thereof.

Aspect 25: A non-transitory computer-readable storage medium comprising at least one instruction for causing a computer or processor to perform operations according to any of aspects 1 to 24.

Aspect 26: An apparatus comprising means for performing operations according to any of aspects 1 to 24.

What is claimed is:

1. An apparatus for performing location prediction, the apparatus comprising:
   at least one network interface;
   at least one memory; and
   at least one processor coupled to the at least one memory, the at least one processor being configured to:
      obtain, via the at least one network interface, radio frequency (RF) data;
      determine a plurality of feature vectors based on the RF data;
      generate a plurality of first clusters based on the plurality of feature vectors, wherein the plurality of first clusters correspond with a plurality of first pseudo-labels;
      determine a plurality of two-dimensional (2D) projection features based on the plurality of feature vectors; and
      train a first machine learning (ML) model using the plurality of first pseudo-labels and the 2D projection features.

2. The apparatus of claim 1, wherein the at least one processor is further configured to:
   process the plurality of 2D projection features to generate a plurality of second clusters, wherein the second clusters correspond with a plurality of second pseudo-labels.

3. The apparatus of claim 2, wherein the at least one processor is further configured to:
   train a second ML model based on the second pseudo-labels.

4. The apparatus of claim 1, wherein the at least one processor is further configured to:
   predict a location of a user based on the plurality of 2D projection features.

5. The apparatus of claim 1, wherein the at least one processor is further configured to:
   receive one or more labeling priors corresponding with an environment associated with the RF data.

6. The apparatus of claim 1, wherein, to generate the plurality of first clusters, the at least one processor is configured to:
   receive a cluster count parameter.

7. The apparatus of claim 1, wherein the 2D projection features are based on at least one of: a triplet-loss, an access-point loss, a zone-loss, or a combination thereof.

8. The apparatus of claim 7, wherein the triplet-loss is based on a similarity of packets corresponding with a wireless device associated with the RF data.

9. The apparatus of claim 7, wherein the zone-loss is based on one or more priors for an environment associated with the RF data.

10. The apparatus of claim 7, wherein the access-point loss is based on at least one of a signal strength, a location, or a combination thereof, for a wireless device associated with the RF data.

11. The apparatus of claim 1, wherein the RF data comprises Channel State Information (CSI).

12. The apparatus of claim 11, wherein the CSI comprises at least one of: transmit antenna information, receive antenna information, sub-carrier information, velocity information, coverage area information, transmitter processing information, receiver processing information, or a combination thereof.

13. A method for performing location prediction, the method comprising:
   obtaining radio frequency (RF) data;
   determining a plurality of feature vectors based on the RF data;
   generating a plurality of first clusters based on the plurality of feature vectors, wherein the plurality of first clusters correspond with a plurality of first pseudo-labels;
   determining a plurality of two-dimensional (2D) projection features based on the plurality of feature vectors; and
   training a first machine learning (ML) model using the plurality of first pseudo-labels and the 2D projection features.

14. The method of claim 13, further comprising:
   processing the plurality of 2D projection features to generate a plurality of second clusters, wherein the second clusters correspond with a plurality of second pseudo-labels.

15. The method of claim 14, further comprising:
   training a second ML model based on the second pseudo-labels.

16. The method of claim 13, further comprising:
   predicting a location of a user based on the plurality of 2D projection features.

17. The method of claim 13, further comprising:
   receiving one or more labeling priors corresponding with an environment associated with the RF data.

18. The method of claim 13, wherein generating the plurality of first clusters, further comprises:
receiving a cluster count parameter.

19. The method of claim 13, wherein the 2D projection features are based on at least one of: a triplet-loss, an access-point loss, a zone-loss, or a combination thereof.

20. The method of claim 19, wherein the triplet-loss is based on a similarity of packets corresponding with a wireless device associated with the RF data.

21. The method of claim 19, wherein the zone-loss is based on one or more priors for an environment associated with the RF data.

22. The method of claim 19, wherein the access-point loss is based on at least one of a signal strength, a location, or a combination thereof, for a wireless device associated with the RF data.

23. The method of claim 13, wherein the RF data comprises Channel State Information (CSI).

24. The method of claim 13, wherein the CSI comprises at least one of: transmit antenna information, receive antenna information, sub-carrier information, velocity information, coverage area information, transmitter processing information, receiver processing information, or a combination thereof.

25. A non-transitory computer-readable storage medium comprising at least one instruction for causing a computer or processor to:
obtain radio frequency (RF) data;
determine a plurality of feature vectors based on the RF data;
generate a plurality of first clusters based on the plurality of feature vectors, wherein the plurality of first clusters correspond with a plurality of first pseudo-labels;
determine a plurality of two-dimensional (2D) projection features based on the plurality of feature vectors; and
train a first machine learning (ML) model using the plurality of first pseudo-labels and the 2D projection features.

26. The non-transitory computer-readable storage medium comprising of claim 25, further comprising at least one instruction for causing the computer or processor to:
process the plurality of 2D projection features to generate a plurality of second clusters, wherein the second clusters correspond with a plurality of second pseudo-labels.

27. The non-transitory computer-readable storage medium of claim 26, further comprising at least one instruction for causing the computer or processor to:
train a second ML model based on the second pseudo-labels.

28. The non-transitory computer-readable storage medium of claim 25, further comprising at least one instruction for causing the computer or processor to:
predict a location of a user based on the plurality of 2D projection features.

29. The non-transitory computer-readable storage medium of claim 25, further comprising at least one instruction for causing the computer or processor to:
receive one or more labeling priors corresponding with an environment associated with the RF data.

30. An apparatus, comprising:
means for obtaining radio frequency (RF) data;
means for determining a plurality of feature vectors based on the RF data;
means for generating a plurality of first clusters based on the plurality of feature vectors, wherein the plurality of first clusters correspond with a plurality of first pseudo-labels;
means for determining a plurality of two-dimensional (2D) projection features based on the plurality of feature vectors; and
means for training a first machine learning (ML) model using the plurality of first pseudo-labels and the 2D projection features.

* * * * *